United States Patent
Iida et al.

(10) Patent No.: US 11,199,626 B2
(45) Date of Patent: Dec. 14, 2021

(54) FISHFINDER

(71) Applicant: HONDA ELECTRONICS CO., LTD., Aichi (JP)

(72) Inventors: Shuji Iida, Toyohashi (JP); Hiroshi Suzuki, Toyohashi (JP)

(73) Assignee: HONDA ELECTRONICS CO., LTD., Toyohashi (JP)

(*) Notice: Subject to any disclaimer, the term of this patent is extended or adjusted under 35 U.S.C. 154(b) by 892 days.

(21) Appl. No.: 15/069,285

(22) Filed: Mar. 14, 2016

(65) Prior Publication Data
US 2016/0274236 A1 Sep. 22, 2016

(30) Foreign Application Priority Data
Mar. 19, 2015 (JP) .............................. JP2015-055961

(51) Int. Cl.
G01S 15/96 (2006.01)
G01S 7/62 (2006.01)
G01S 15/89 (2006.01)

(52) U.S. Cl.
CPC ............ *G01S 15/96* (2013.01); *G01S 7/6218* (2013.01); *G01S 7/6272* (2013.01); *G01S 15/89* (2013.01)

(58) Field of Classification Search
CPC .......... G01S 15/96; G01S 15/10; G01S 15/89; G01S 7/62; G01S 7/6218; G01S 7/6272
See application file for complete search history.

(56) References Cited

U.S. PATENT DOCUMENTS

| | | | | |
|---|---|---|---|---|
| 4,597,069 A * | 6/1986 | Milano | ................... | G01S 15/96 367/108 |
| 4,829,492 A * | 5/1989 | Choi | ......................... | G01S 7/56 181/124 |
| 5,327,398 A * | 7/1994 | Wansley | ............... | G01S 7/6209 367/108 |
| 6,595,315 B1 * | 7/2003 | Fujimoto | .............. | G01S 7/6218 181/124 |
| 6,628,569 B1 * | 9/2003 | Steiner | .................... | G01S 15/96 367/111 |
| 6,724,688 B2 * | 4/2004 | Betts | ...................... | A01K 93/02 367/99 |

(Continued)

FOREIGN PATENT DOCUMENTS

JP 2013-79813 A 5/2013

*Primary Examiner* — Isam A Alsomiri
*Assistant Examiner* — Amie M Ndure
(74) *Attorney, Agent, or Firm* — Westerman, Hattori, Daniels & Adrian, LLP

(57) ABSTRACT

A fishfinder has: a transducer capable of transmitting an ultrasonic wave underwater and receiving a reflected wave of the ultrasonic wave; a display part that time-sequentially arranges a detection image based on a reception signal, caused by receiving the reflected wave with the transducer; a first depth calculation part that calculates a first depth as a depth of the bottom; a recognition part that performs recognition on an object as a fish school; a second depth calculation part that calculates a second depth as a depth of a position of the object; a distance calculation part that calculates a distance from the bottom to the position of the object; and a distance display part that displays the distance calculated with the distance calculation part, in correspondence with the position of the object in the detection image displayed on the display part, on the display part.

10 Claims, 8 Drawing Sheets

(56) References Cited

U.S. PATENT DOCUMENTS

| | | | | |
|---|---|---|---|---|
| 6,768,701 B1* | 7/2004 | Cummings | G01S 15/96 | 367/109 |
| 6,771,562 B2* | 8/2004 | Betts | A01K 93/02 | 367/111 |
| 7,379,384 B1* | 5/2008 | Moreman | G01S 7/6263 | 367/8 |
| 9,142,206 B2* | 9/2015 | O'Dell | G10K 11/006 | |
| 9,268,020 B2* | 2/2016 | Coleman | G01S 7/521 | |
| 9,880,274 B2* | 1/2018 | Shiraki | G01S 7/539 | |
| 2004/0130442 A1* | 7/2004 | Breed | B60C 11/24 | 340/443 |
| 2004/0135992 A1* | 7/2004 | Munro | G01S 7/483 | 356/4.01 |
| 2005/0031016 A1* | 2/2005 | Rosen | H04B 1/69 | 375/130 |
| 2005/0031051 A1* | 2/2005 | Rosen | H04B 1/713 | 375/295 |
| 2005/0064774 A1* | 3/2005 | Grune | B63B 35/7906 | 441/74 |
| 2005/0169106 A1* | 8/2005 | Chen | G01S 15/74 | 367/118 |
| 2005/0226312 A1* | 10/2005 | Koslar | H04B 1/69 | 375/142 |
| 2006/0132370 A1* | 6/2006 | Tietjen | G01S 7/03 | 343/757 |
| 2006/0133210 A1* | 6/2006 | Ishihara | G01S 7/527 | 367/99 |
| 2006/0287596 A1* | 12/2006 | Johnson | A61B 5/4312 | 600/437 |
| 2008/0100503 A1* | 5/2008 | Yanagi | G01S 7/064 | 342/176 |
| 2008/0112265 A1* | 5/2008 | Urbano | G01S 7/52096 | 367/87 |
| 2008/0114245 A1* | 5/2008 | Randall | A61B 8/42 | 600/447 |
| 2009/0064403 A1* | 3/2009 | Wolfe | G08B 21/082 | 4/504 |
| 2009/0147623 A1* | 6/2009 | Betts | G01S 7/521 | 367/88 |
| 2009/0174931 A1* | 7/2009 | Huber | H01S 3/1106 | 359/340 |
| 2009/0224962 A1* | 9/2009 | Pao | G01S 3/74 | 342/179 |
| 2010/0284248 A1* | 11/2010 | Wang | G01S 7/6227 | 367/88 |
| 2012/0263018 A1* | 10/2012 | Yamaguchi | G01S 7/524 | 367/88 |

* cited by examiner

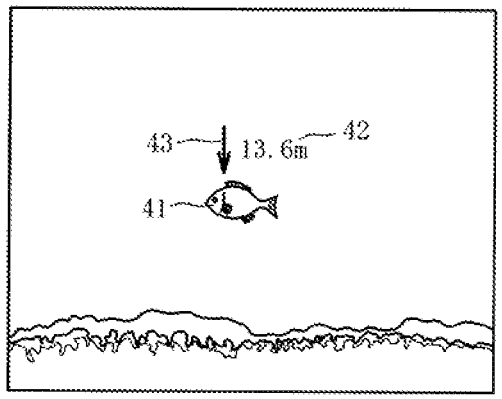
FIG. 6A1
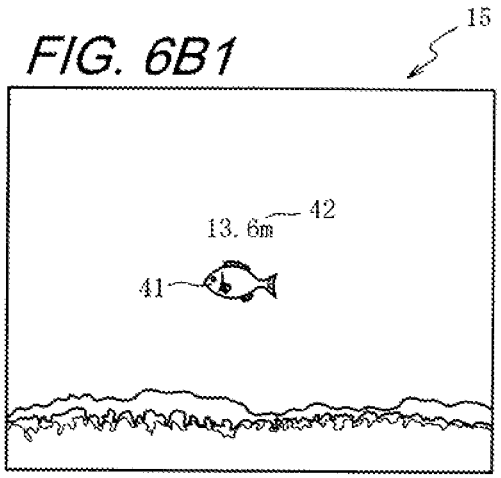
FIG. 6B1
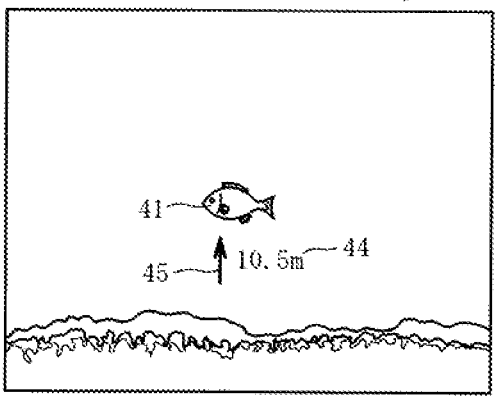
FIG. 6A2
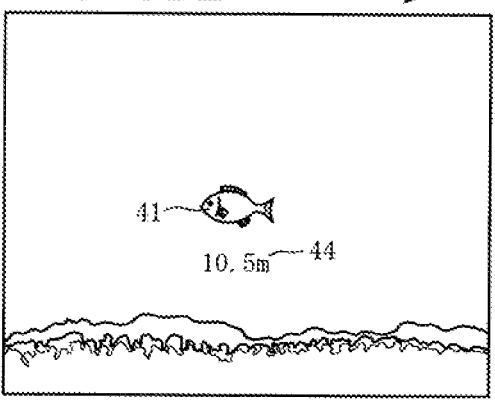
FIG. 6B2
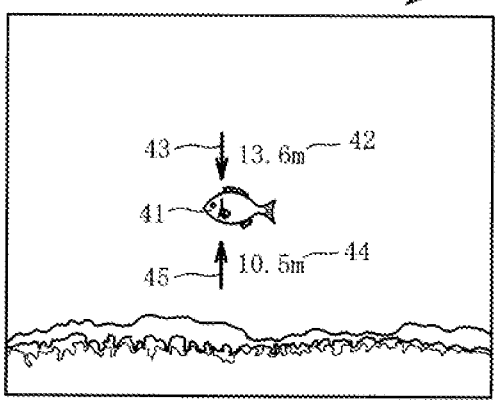
FIG. 6A3
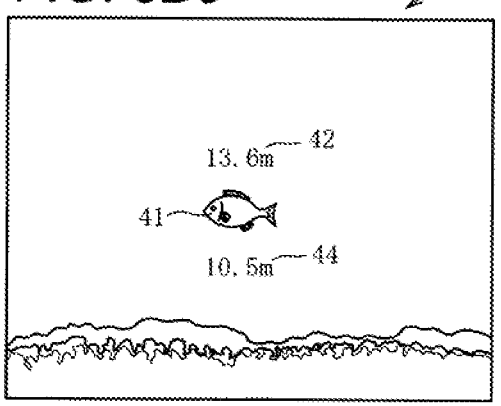
FIG. 6B3

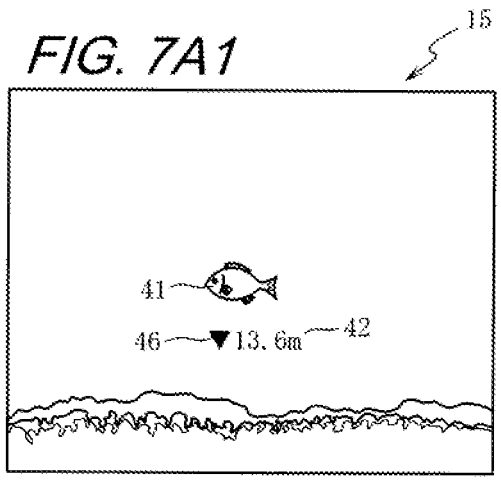
FIG. 7A1
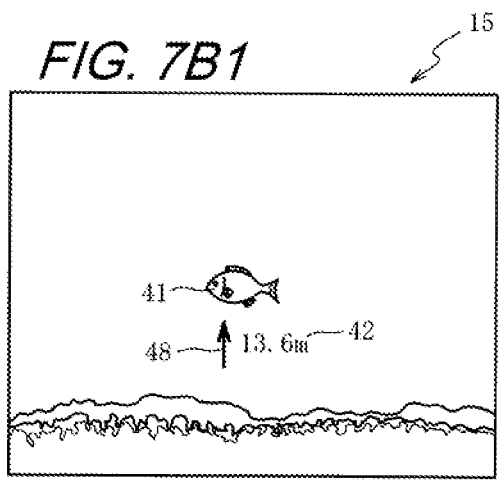
FIG. 7B1
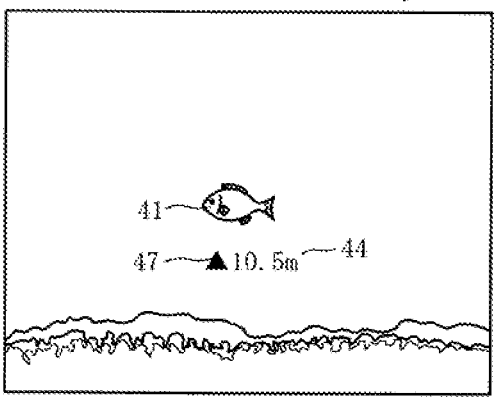
FIG. 7A2
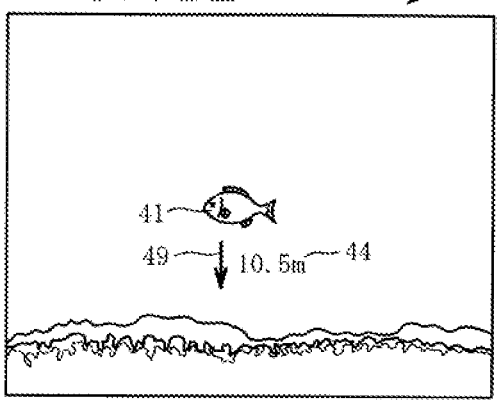
FIG. 7B2
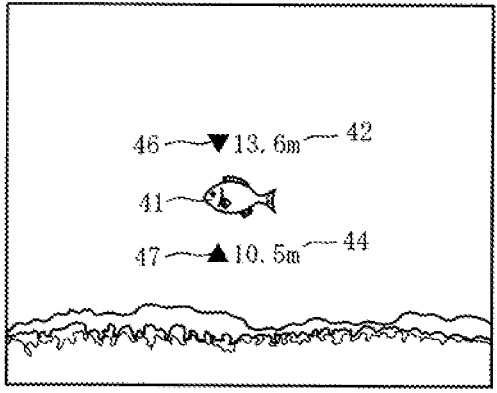
FIG. 7A3
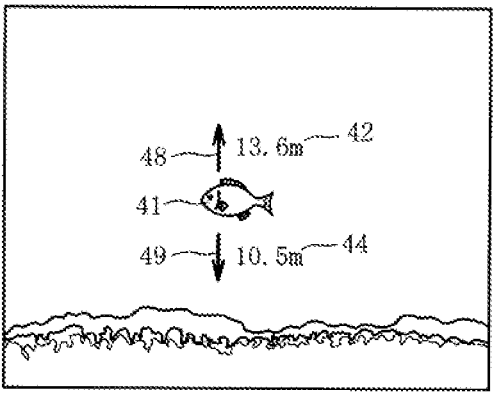
FIG. 7B3

FIG. 8A1
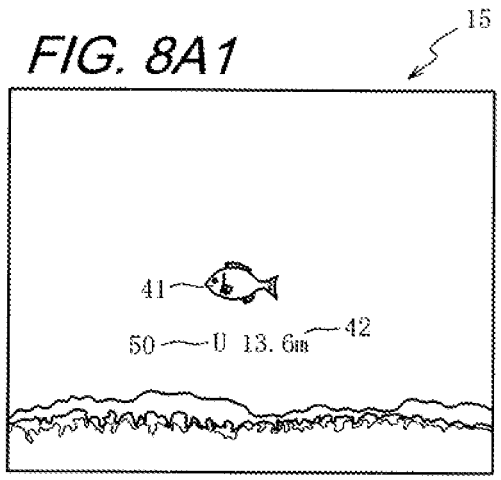
FIG. 8B1
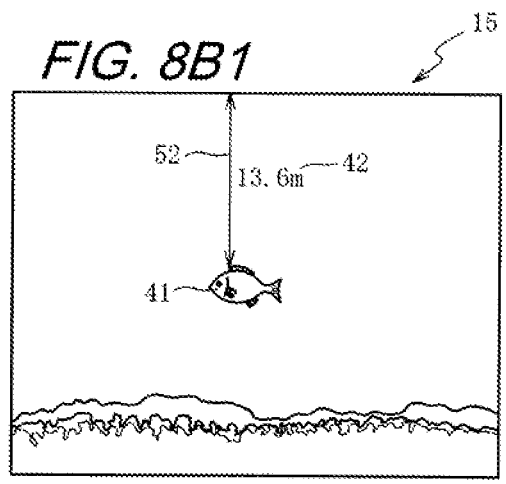
FIG. 8A2
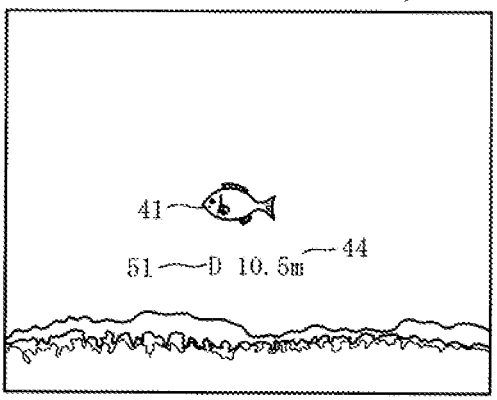
FIG. 8B2
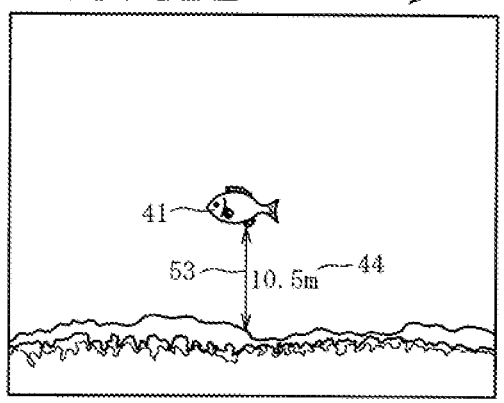
FIG. 8A3
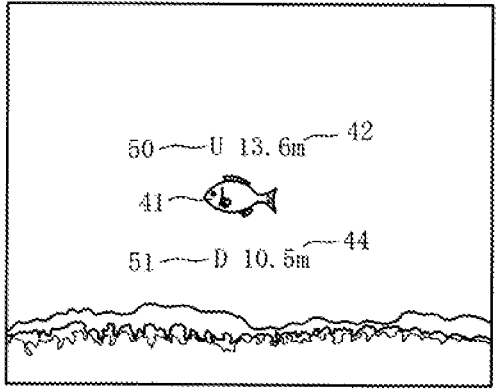
FIG. 8B3
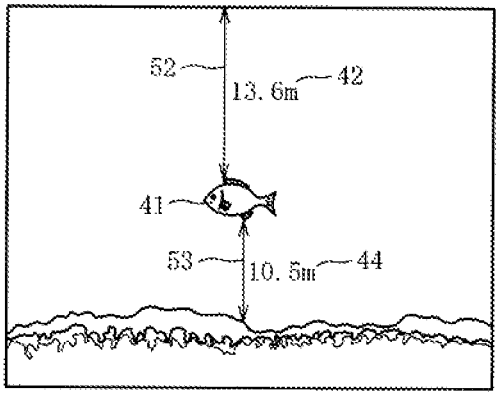

FISHFINDER

BACKGROUND OF THE INVENTION (1) Field of the Invention

The present invention relates to a fishfinder which time-sequentially arranges and displays a detection image based on a reception signal obtained by receiving a reflected wave of an ultrasonic wave transmitted underwater.

(2) Description of the Related Art

As an apparatus for detecting a detection subject such as an underwater fish school by transmission/reception of an ultrasonic wave, a fishfinder is known (e.g., Japanese Unexamined Patent Application Publication No. 2013-79813). In the fishfinder, a thin beam-shaped ultrasonic wave is transmitted (emitted) from a transducer provided on the bottom and such of a ship toward the bottom of the sea. The reflected wave of the beam-shaped ultrasonic wave is received with the transducer. In the fishfinder, a detection image, indicating the position of an object that reflected the ultrasonic wave and its reflection intensity (level), is formed based on a reception signal obtained by receiving the reflected wave with the transducer. The detection images are time-sequentially arranged and displayed on a display device.

A user of the fishfinder observes the detection images and determines the existence/absence of a fish school and the depth of the position where the fish school exists. However, when a user unaccustomed to operate the fishfinder observes the detection images, the user cannot instantly determine the existence/absence of the fish school and the depth of the position where the fish school exists without difficulty.

In some of recent fishfinderes, the reception signal, obtained by receiving the reflected wave of the ultrasonic wave with the transducer, is analyzed, to determine the existence/absence of a reflected wave from a fish school. Then a picture (e.g., a fish-shaped symbol) is displayed in a position of an object recognized as a fish school, with respect to a detection image. With this operation, it is possible to enable the user to instantly grasp the existence/absence of a fish school.

Further, among such fishfinderes, some apparatus calculates the depth of the position of an object recognized as a fish school, and displays the calculated depth in the vicinity of a picture indicating the fish school, such that a user instantly grasp the depth of the position of the fish school.

In actual fishing, a fishing method of submerging a sinker or a rig to the bottom and retrieving the fishline is known. However, in the above-described fishfinder, although it is possible for a user unaccustomed to operation of the fishfinder to instantly grasp the depth of the position where the fish school exists, it is difficult to instantly determine the distance from the bottom to the position where the fish school exists. Accordingly, it is impossible for such user to determine the amount of retrieval of the fishline.

SUMMARY OF THE INVENTION

The present invention has been made to address the above-described problems, and provides a fishfinder which enables a user to instantly grasp the distance from the bottom to a fish school.

To attain the object, provided is a fishfinder including: a transducer capable of transmitting an ultrasonic wave underwater, and receiving a reflected wave of the ultrasonic wave; a display part that time-sequentially arranges and displays a detection image, based on a reception signal caused by receiving the reflected wave of the ultrasonic wave transmitted from the transducer, with the transducer; a first depth calculation part that calculates a first depth as a depth of a bottom based on the reception signal; a recognition part that performs recognition on an object as a fish school based on the reception signal; a second depth calculation part that calculates a second depth as a depth of a position of the object recognized as the fish school with the recognition part; a distance calculation part that calculates a distance from the bottom to the position of the object recognized as the fish school with the recognition part, based on the first depth calculated with the first depth calculation part and the second depth calculated with the second depth calculation part; and a distance display part that displays the distance calculated with the distance calculation part, in correspondence with the position of the object recognized as the fish school with the recognition part, in the detection image displayed on the display part, on the display part.

In accordance with the present invention, detection images, based on the reception signal obtained by receiving the reflected wave of the ultrasonic wave transmitted from the transducer underwater, with the transducer, are time-sequentially arranged and displayed on the display part.

In the fishfinder, the first depth as the depth of the bottom is calculated with the first depth calculation part based on the reception signal. In contrast, the recognition part recognizes a fish school based on the reception signal. With this operation, the second depth calculation part calculates the second depth as a depth of the position of the object recognized as a fish school. Then, the distance calculation part calculates the distance from the bottom to the position of the object recognized with the recognition part as a fish school based on the first depth and the second depth. The value calculated with the distance calculation part is displayed on the display part with the distance display part in correspondence with the position of the object recognized with the recognition part as a fish school, in the detection image displayed on the display part. Accordingly, with this value displayed on the display part, the user is enabled to instantly grasp the distance from the bottom to the position of the object recognized as a fish school.

BRIEF DESCRIPTION OF THE DRAWINGS

The above and other object, features and advantages of the present invention will become more apparent from the following detailed description when taken in conjunction with the accompanying drawings wherein:

FIGS. 6A1 to 6A3 are examples of display content on the display device in the fishfinder according to a second embodiment of the present invention when the fish mark display flag is ON and the distance display setting register is set to other value than "none";

FIGS. 6B1 to 6B3 are examples of display content on the display device in the fishfinder according to a third embodiment of the present invention when the fish mark display flag is ON and the distance display setting register is set to other value than "none";

FIGS. 7A1 to 7A3 are examples of display content on the display device in the fishfinder according to a fourth embodiment of the present invention when the fish mark display flag is ON and the distance display setting register is set to other value than "none";

FIGS. 7B1 to 7B3 are examples of display content on the display device in the fishfinder according to a fifth embodiment of the present invention when the fish mark display flag is ON and the distance display setting register is set to other value than "none";

FIGS. 8A1 to 8A3 are examples of display content on the display device in the fishfinder according to a sixth embodiment of the present invention when the fish mark display flag is ON and the distance display setting register is set to other value than "none";

FIGS. 8B1 to 8B3 are examples of display content on the display device in the fishfinder according to a seventh embodiment of the present invention when the fish mark display flag is ON and the distance display setting register is set to other value than "none"

DETAILED DESCRIPTION OF THE PREFERRED EMBODIMENTS

Figure 1:
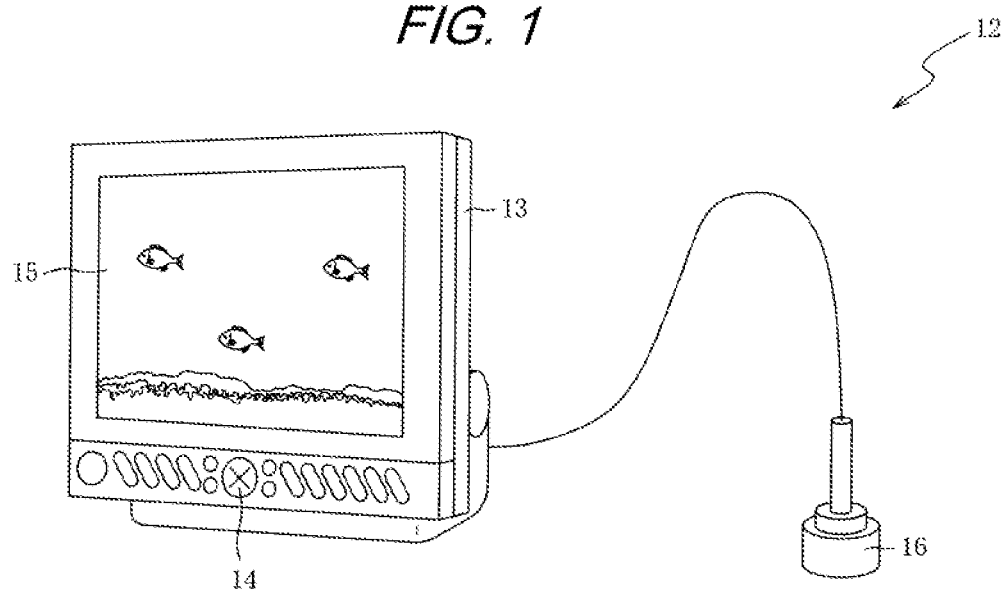
FIG. 1 is a perspective diagram schematically showing a configuration of a fishfinder according to one embodiment of the present invention.
Figure 2:
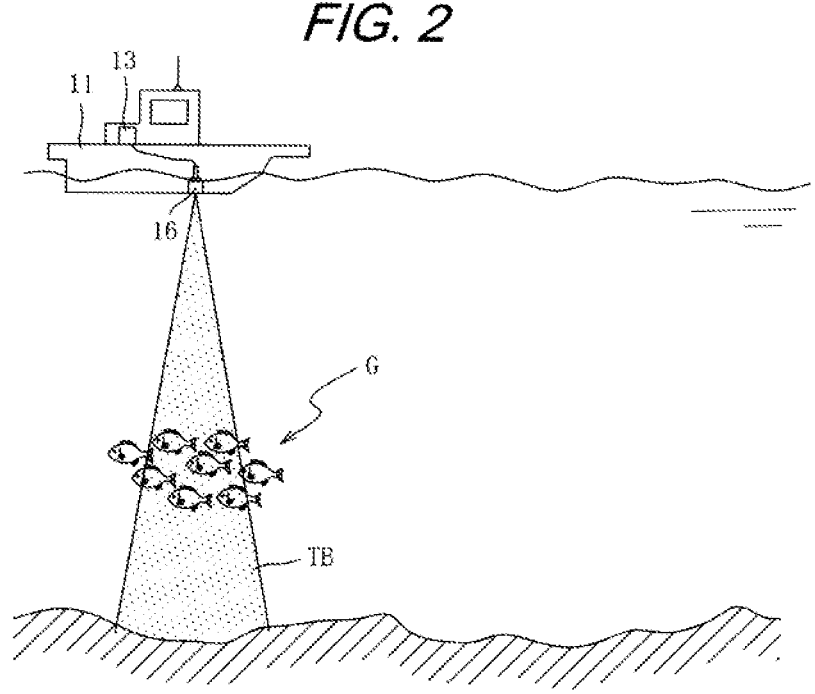
FIG. 2 is a schematic side diagram showing a status where underwater detection is performed with a ship in which the fishfinder is incorporated.

Hereinbelow, embodiments for implementation of the present invention will be described with reference to the attached drawings. First, the outline of a fishfinder 12 according to a first embodiment of the present invention will be described with reference to FIGS. 1 and 2. FIG. 1 is a perspective diagram schematically showing the configuration of the fishfinder 12. FIG. 2 is a schematic side diagram showing a status where underwater detection is performed with a ship 11 in which the fishfinder 12 is incorporated.

As shown in FIGS. 1 and 2, the fishfinder 12, which is incorporated in the ship 11, performs underwater detection of a detection subject G such as a fish school immediately below or around the ship 11. The fishfinder 12 has a main body 13, an operation button 14, provided in the main body 13, to accept input from a user, a display device 15 integrally formed with the main body 13, and a transducer 16 to transmit/receive an ultrasonic wave beam TB.

The transducer 16 is fixed to the bottom or stern of the ship 11, and is electrically connected to the main body 13 via a cable. The transducer 16 transmits (emits) a thin beam-shaped ultrasonic wave beam TB in one direction (e.g. in a direction immediately below the ship 11) in accordance with a signal transmitted from the main body 13. Further, the transducer 16 receives a reflected wave of the ultrasonic wave beam TB reflected from the detection subject G or bottom such as the seabed, the bottom of a lake, the bottom of a river, or the bottom of a pond. The transducer 16 transmits a reception signal obtained by reception of the reflected wave to the main body 13.

The main body 13 of the fishfinder 12 is provided, for example, in a pilothouse of the ship 11. The main bod 13 forms a detection image based on the reception signal obtained by receiving the reflected wave of the ultrasonic wave beam TB with the transducer 16. The detection image is displayed on the display device 15, such that the result of underwater detection is indicated for the user.

The fishfinder 12 is configured such that, upon display of the detection image on the display device 15, when an object recognized as a fish school exists in the detection image, it enables the user to instantly grasp the distance from the bottom to the fish school.

Next, the electrical configuration of the fishfinder 12 will be described with reference to FIG. 3. The fishfinder 12 has a control device 20 in the main body 13. The control device 20 controls the operation of the fishfinder 12. The control device 20 has a CPU (Central Processing Unit) 21, a ROM (Read Only Memory) 22, a RAM (Random Access Memory) 23, a transmission/reception circuit 31, a display controller 32, and a VRAM (Video RAM) 33.

The ROM 22, the RAM 23, the transmission/reception circuit 31, and the display controller 32 are connected to the CPU 21. Further, the operation button 14 (see FIG. 1) is connected from the outside of the control device 20 to the CPU 21. The transducer 16 (see FIG. 1) is connected to the transmission/reception circuit 31. The VRAM 23 and the display device 15 (see FIG. 1) are connected to the display controller 32.

The CPU 21 is an arithmetic unit which performs various arithmetic operations to control the operation of the fishfinder 12 in accordance with program data 22a stored in the ROM 22.

The ROM 22 is a non-rewritable nonvolatile memory for storing the program data 22a executed with the CPU 21, fixed value data and the like. Note that a rewritable nonvolatile memory (e.g. a flash memory) may be used in place of the non-rewritable ROM. The ROM 22 holds image data 22b, as fixed value data, to display e.g. detection images, symbols (including characters) and pictures on the display device 15.

Although the details will be described later with reference to FIG. 5, when an object recognized as a fish school exists in the detection image displayed on the display device 15, the fishfinder 12 displays a fish mark 41 in the position of the object recognized as a fish school.

Further, the fishfinder 12 displays a depth (a depth from the surface) 42 of the position of the object recognized as a fish school and a distance 44 from the bottom to the position, in the vicinity of the fish mark 41 displayed in the position. Further, in the vicinity of the depth 42 or the distance 44 from the bottom, an arrow 43 or 45, indicating that it is the depth 42 or the distance 44 from the bottom, is displayed.

The image data 22b, stored in the ROM 22, is necessary to display pictures such as this fish mark 41, characters (symbols) indicating the value of the depth 42, and the distance 44 from the bottom, and the symbols such as the arrows 43 and 44, on the display device 15.

The RAM 23 is a rewritable nonvolatile memory which temporarily holds various data upon program execution with the CPU 21. The RAM 23 holds at least reception signal data 23a, a fish mark display flag 23b, a distance display setting register 23c, bottom depth data 23d, and fish depth data 23e.

The reception signal data 23a indicates the reception signal obtained by receiving the reflected wave of the ultrasonic wave beam TB with the transducer 16. The RAM 23 temporarily holds the reception signal input from the transducer 16 as the reception signal data 23a.

The CPU 21 analyzes the reception signal data 23a, and detects a reflected wave with the highest intensity from the reception signal data 23a. With this detection, the bottom is determined. Then the depth of the bottom is calculated from time between the transmission of the ultrasonic wave beam TB with the transducer 16 and the reception of the reflected wave with the highest intensity.

Further, the reflected wave caused between the surface and the bottom is detected using the reception signal data 23a, and based on the time from the transmission of the ultrasonic wave beam TB with the transducer 16 to the reception of the reflected wave, the depth of the position where the ultrasonic wave beam TB has been reflected is determined. Then the intensity level of the reflected wave at the depth is specified with the reception signal data 23a. Then a detection image for 1 display line indicating the intensity level of the reflected wave at the depth where the reflected wave has been caused between the surface and the bottom is generated.

Further, the reception signal data 23a is also used in fish school recognition. That is, when the intensity level of the reflected wave caused between the surface and the bottom is within a predetermined range of recognition as a fish school, it is recognized that a fish school exists in the position where the reflected wave has been caused. When it is recognized that a fish school exists, based on the reception signal data 23a, the time between the transmission of the ultrasonic wave beam TB with the transducer 16 and the reception of the reflected wave of the ultrasonic wave beam TB reflected in the position of the object recognized as a fish school is determined. Then the depth of the position of the object recognized as a fish school is calculated.

The fish mark display flag 23b is a flag for setting as to whether or not the fish mark 41 (see FIG. 5) is to be displayed. When there is a reflected wave, which is recognized as a reflected wave caused with a fish school based on the reflected wave of the ultrasonic wave beam TB received with the transducer 16, the fish mark 41 is displayed in the position of the object recognized as a fish school in the detection image displayed on the display device 15.

When the fish mark display flag 23b is set to ON, setting to display the fish mark 41 is performed. When the fish mark display flag 23b is set to OFF, setting to hide the fish mark 41 is performed.

When the power of the fishfinder 12 is turned ON, the fish mark display flag 23b is set to OFF as an initial value. That is, immediately after the power-up, the fish mark 41 is not displayed. The setting of the fish mark display flag 23b (ON/OFF switching) is made by the user's manipulating the operation button 14.

That is, when the user is to display the fish mark 41 in the position of an object recognized as a fish school in the detection image, it is possible to set the fish mark display flag 23b to ON and perform the display by manipulating the operation button 14. Further, when the fish mark 41 is displayed in the detection image, the user can cancel (hide) the display of the fish mark 41 by manipulating the operation button 14 to set the fish mark display flag 23b to OFF.

Note that when the power of the fishfinder 12 is turned ON, the initial value set in the fish mark display flag 23b is not necessarily OFF but may be ON. In this case, immediately after the power-up, the fish mark 41 is displayed in the position of the object recognized as a fish school in the detection image on the display device 15.

The distance display setting register 23c is a register for setting as to whether one or both of the depth 42 of the position of the object recognized as a fish school and the distance 44 (see FIG. 5) from the bottom to the position of the object recognized as a fish school are displayed in correspondence with the fish mark 41, on the condition that the fish mark display flag 23b is ON, that is, when the fish mark 41 is displayed in the position of the object recognized as a fish school in the detection image.

In the distance display setting register 23c, any of "depth", "distance from bottom", "both" and "none" is set. When the "depth" is set, the depth 42 of the position of the object recognized as a fish school is displayed, in correspondence with the fish mark 41, on the display device 15. When the "distance from bottom" is set, the distance 44 from the bottom to the position of the object recognized as a fish school is displayed, in correspondence with the fish mark 41, on the display device 15. Further, when the "both" is set, the both of the depth 42 of the position of the object recognized as a fish school and the distance 44 from the bottom are displayed, in correspondence with the fish mark 41, on the display device 15. In contrast, when the "none" is set, the depth 42 of the position of the object recognized as a fish school and the distance 44 from the bottom are not displayed on the display device 15.

In this distance display setting register 23c, when the power of the fishfinder 12 is turned ON, the "both" is set as an initial value. That is, immediately after the power-up, the both of the depth 42 of the position of the object recognized as a fish school and the distance 44 from the bottom are displayed, in correspondence with the fish mark 41, on the display device 15.

Note that immediately after the turning ON of the power, as the fish mark display flag 23b is initialized to OFF, the depth 42 of the position of the object recognized as a fish school and the distance 44 from the bottom are not displayed. Then, after the power-up, when the user sets the fish mark display flag 23b to ON while the initial value is kept in the distance display setting register 23c, the both of the depth 42 of the position of the object recognized as a fish school and the distance 44 from the bottom are displayed together with the fish mark 41, in correspondence with the fish mark 41, on the display device 15.

The user performs setting of the distance display setting register 23c (switching among "depth", "distance from bottom", "both", and "none") by manipulating the operation button 14. That is, the user can freely display or hide the depth 42 of the position of the object recognized as a fish school and the distance 44 from the bottom, in correspondence with the fish mark 41, on the display device 15 by manipulating the operation button 14.

Note that when the power of the fishfinder 12 is turned ON, the initial value set in the fish mark display flag 23b is not necessarily "both", but any of the four values of the distance display setting register 23c may be set as an initial value.

Further, it may be arranged such that the fish mark display flag 23b and the distance display setting register 23c are separately provided in the control device 20, or they may be stored in a rewritable nonvolatile memory such as a flash memory provided in place of the ROM 22. In this case, even when the power of the fishfinder 12 is turned OFF, it is possible to keep the values set in the fish mark display flag 23b and the distance display setting register 23c.

With this configuration, immediately after the turning-ON of the fishfinder 12, it is not necessary to set initial values in the fish mark display flag 23b and the distance display setting register 23c. It is possible to use the values in the fish mark display flag 23b and the distance display setting register 23c set before the previous turning-OFF of the power.

Accordingly, even when the user manipulates the operation button 14 for setting of the fish mark display flag 23b or the distance display setting register 23c then turns OFF the power of the fishfinder 12 and again turns it ON, it is possible to perform display on the display device based on the value of the fish mark display flag 23*b* or the distance display setting register 23*c* set by the user before the power-off. Accordingly, upon each power-up of the fishfinder 12, it is possible to suppress the user's manipulating the operation button 14 to repeat setting of the fish mark display flag 23*b* or the distance display setting register 23*c*.

The bottom depth data 23*d* indicates the depth of the bottom (the depth from the surface to the bottom). The fish depth data 23*e* indicates the depth 42 of the position of the object recognized as a fish school (the depth from the surface to the position of the object recognized as a fish school).

When the transducer 16 receives the reflected wave of the ultrasonic wave beam TB transmitted from the transducer 16, bottom determination is performed with the CPU 21 based on the reception signal data 23*a*, and the depth of the bottom is calculated. The calculated depth of the bottom is stored as the bottom depth data 23*d* into the RAM 23. Further, based on the reception signal data 23*a*, fish school recognition is performed with the CPU 21. When there is an object recognized as a fish school, the depth 42 (see FIG. 5) of the position of the object recognized as a fish school is calculated. The calculated depth 42 of the position of the object recognized as a fish school is stored as the fish depth data 23*e* into the RAM 23.

The bottom depth data 23*d* is used for display of the depth of the bottom on the display device 15. Further, the fish depth data 23*e* is used for display of the depth 42 of the position of the object recognized as a fish school on the display device 15 when the fish mark display flag 23*b* is set to ON and the distance display setting register 23*c* is set to the "depth" or the "both".

Further, when the fish mark display flag 23*b* is set to ON and the distance display setting register 23*c* is set to the "distance from bottom" or the "both", the distance 44 from the bottom to the position of the object recognized as a fish school is calculated by subtracting the depth 42 of the position of the object recognized as a fish school indicated in the fish depth data 23*e* from the depth of the bottom indicated in the bottom depth data 23*d*. Then the calculated distance 44 from the bottom is displayed on the display device 15.

The transmission/reception circuit 31 drives the transducer 16 under the control of the CPU 21, to transmit the ultrasonic wave beam TB from the transducer 16. Further, the transmission/reception circuit 31 accepts input of the reception signal obtained by receiving the reflected wave of the transmitted ultrasonic wave beam TB with the transducer 16. The transmission/reception circuit 31 digitizes the reception signal input from the transducer 16, and stores the digital value, as the reception signal data 23*a*, into the RAM 23 connected to the CPU 21.

The display controller 32 controls display on the display device 15 under the control of the CPU 21. The VRAM 33 is a memory having two frame buffers respectively for storing 1 frame image to be displayed on the display device 15.

The display controller 32 reads an image for 1 frame, immediately previously drawn with respect to one frame buffer, and displays the image on the display device 15, while drawing an image for 1 frame to be displayed next with respect to the other frame buffer. The display controller 32 performs image drawing and image display in parallel by switching the frame buffer as the subject of image drawing and the frame buffer as the subject of image reading alternately.

When the display controller 32 receives input of a detection image for 1 display line formed with the CPU 21, it arranges the detection image for 1 display line and the past-input detection images for plural display lines time sequentially, thus forms a detection image to be displayed on the display device 15. The display controller 32 stores the formed detection image into the frame buffer of the VRAM 33.

Note that the detection image for 1 display line received from the CPU 21 is stored in a line memory (not shown) provided in the display controller 32. The line memory is capable of storing detection images for a predetermined number of display lines. By using the detection images for the predetermined number of display lines stored in the line memory, it is possible to arrange a detection image for 1 display line received from the CPU 21 and past-input detection images for plural display lines time sequentially and form a detection image to be displayed on the display device 15.

Further, when the display controller 32 receives the image data 22*b* to display symbols and pictures to be displayed along with the detection image on the display device 15 from the CPU 21, it draws the symbols and pictures to be displayed in the position of 1 frame designated with the CPU 21, with respect to the frame buffer of the VRAM 33, using the image data 22*b* received from the CPU 21.

Figure 4:
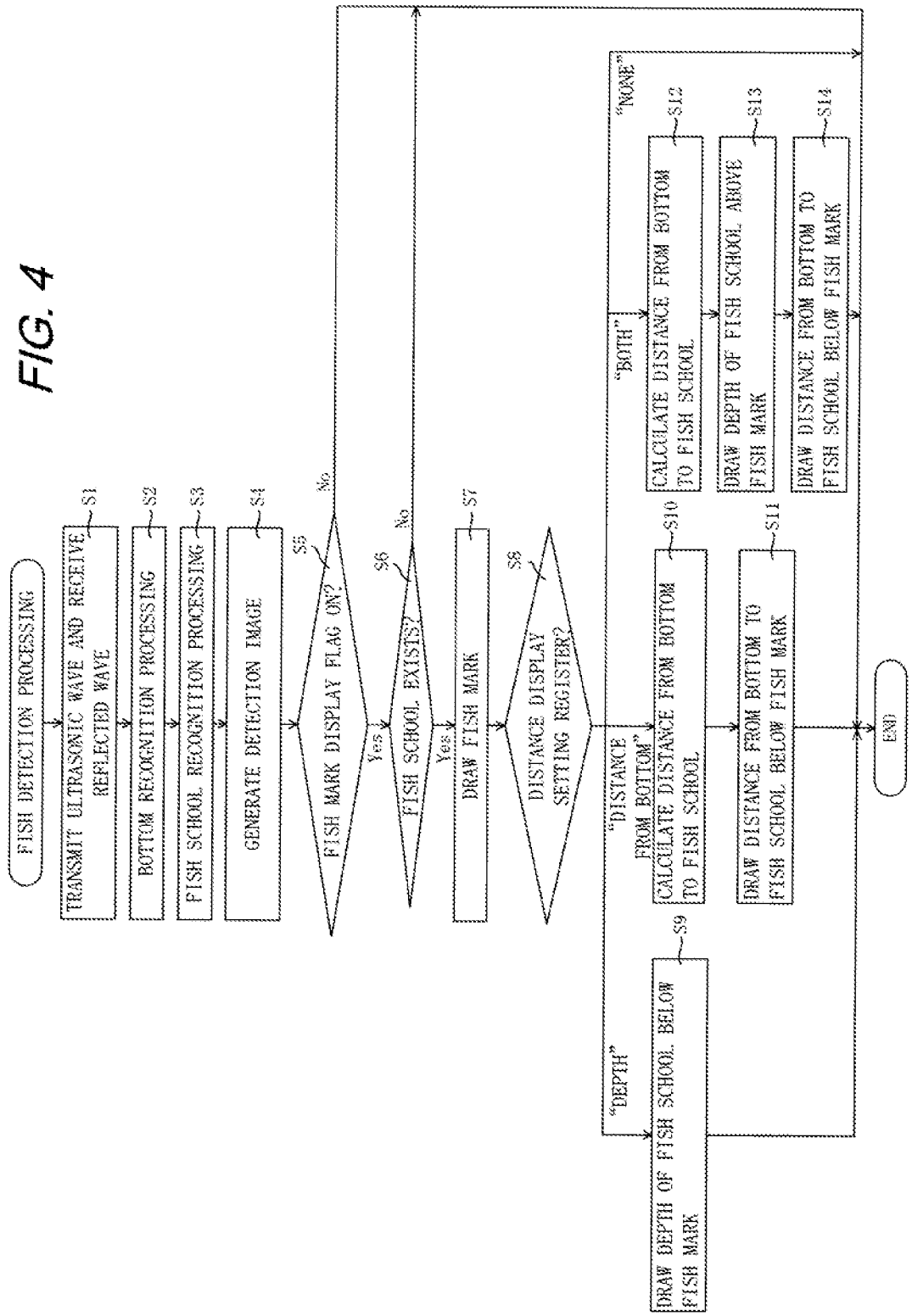
FIG. 4 is a flowchart showing fish detection processing performed with a CPU.

Next, the details of the fish detection processing performed with the CPU 21 will be described with reference to FIG. 4. FIG. 4 is a flowchart showing the fish detection processing. The fish detection processing includes: transmitting the ultrasonic wave beam TB underwater; analyzing the reception signal obtained by receiving the reflected wave of the ultrasonic wave beam TB; and displaying an underwater detection image on the display device 15.

The fish detection processing is performed with the CPU 21 repeatedly for each predetermined time period while the power is ON, or since the user starts the underwater detection by manipulating the operation button 14 until the user instructs the end of the detection. Note that a program for execution of the fish detection processing is included in the program data 22*a* (see FIG. 3) in the ROM 22.

In the fish detection processing, first, the ultrasonic wave beam TB is transmitted from the transducer 16 via the transmission/reception circuit 31. Then the reflected waves, reflected from the detection subject G and the bottom with respect to the ultrasonic wave beam TB, are received with the transducer 16 (S1). The reception signal, obtained by receiving the reflected wave with the transducer 16, is stored as the reception signal data 23*a*, via the transmission/reception circuit 31, into the RAM 23.

Next, a reflected wave with the highest intensity is detected from the reception signal data 23*a* stored in the RAM 23. With this detection, the bottom is determined, and the depth of the bottom is calculated from time between the transmission of the ultrasonic wave beam TB from the transducer 16 and the reception of the reflected wave with the highest intensity (S2). In the processing at S2, the calculated depth is stored as the bottom depth data 23*d* into the RAM 23.

Next, fish school recognition processing is performed (S3). In the fish school recognition processing, based on the reception signal data 23*a* stored in the RAM 23, a reflected wave at an intensity level within a predetermined range of recognition as a fish school is detected among the reflected waves caused between the surface and the bottom. When a reflected wave at an intensity level within the predetermined range is found, it is recognized that a fish school exists in the position where the reflected wave has been caused.

In the processing at S3, when the existence of a fish school is recognized in the fish school recognition processing, the time from the transmission of the ultrasonic wave beam TB from the transducer 16 to the reception of the reflected wave of the ultrasonic wave beam TB, reflected in the position of the object recognized as a fish school, is determined from the reception signal data 23a. Then the depth 42 (see FIGS. 5A to 5C) of the position of the object recognized as a fish school is calculated based on the determined time. The calculated depth 42 is stored as the fish depth data 23e into the RAM 23.

Next, using the reception signal data 23a stored in the RAM 23, a detection image for 1 display line is generated and is transferred to the display controller 32 (S4). More particularly, as the generation of the detection image for 1 display line, first, a reflected wave caused between the surface and the bottom is detected from the reception signal data 23a, and the depth of the position where the ultrasonic wave beam TB has been reflected is determined. Then, the intensity level of the reflected wave at the depth is specified from the reception signal data 23a, so as to generate a detection image for 1 display line indicating the intensity level of the reflected wave at the depth of the reflected wave between the surface and the bottom.

The detection image for 1 display line, transferred to the display controller 32 by the processing at S4, is arranged, along with plural detection images for plural display lines transferred in the past, time sequentially, with the display controller 32. Thus a detection image to be displayed on the display device 15 is formed, and is drawn in the frame buffer of the VRAM 33.

Next, it is determined whether or not the fish mark display flag 23b is ON (S5). When the fish mark display flag 23b is OFF (S5: NO), the fish detection processing ends. With this processing, the detection image, formed with the display controller 32 based on the processing at S4 and drawn in the frame buffer of the VRAM 33, is displayed on the display device 15.

In contrast, when it is determined as a result of determination at S5 that the fish mark display flag 23b is ON (S5: YES), next, it is determined whether or not the existence of the fish school has been recognized in the fish school recognition processing performed at S3 (S6). When it is determined that the existence of the fish school has not been recognized (S6: NO), the fish detection processing ends. With this processing, as in the case of the negative determination at S5 (S5: NO), the detection image, formed with the display controller 32 based on the processing at S4 and drawn in the frame buffer of the VRAM 33, is displayed on the display device 15.

In contrast, when it is determined as a result of determination at S6 that the existence of the fish school has been recognized (S6: YES), the image data 22b on the fish mark 41 (see FIGS. 5A to 5C) is transmitted to the display controller 32. Then the display controller 32 is instructed to draw the fish mark 41 in the position of the object recognized as a fish school (S7). The display controller 32 draws the fish mark 41 in the position indicated with the instruction (the position of the object recognized as a fish school) with respect to the frame buffer of the VRAM 33, based on the instruction. With this processing, the fish mark 41 is displayed in the position of the object recognized as a fish school in the detection image displayed on the display device 15.

Next, the value set in the distance display setting register 23c is determined (S8). When the distance display setting register 23c is set to "depth" (S8: "depth"), the display controller 32 is instructed to draw characters indicating the value of the depth 42 in the position of the object recognized as a fish school below the fish mark 41 displayed in the position of the object recognized as a fish school, and the downward arrow 43 as a symbol indicating that it is the depth from the surface on the left hand of the characters, with respect to the detection image drawn in the frame buffer of the VRAM 33 (S9). The depth 42 in the position of the object recognized as a fish school is specified with the fish depth data 23e. Further, in the processing at S9, prior to the instruction, the image data 22b to display the characters indicating the value of the depth 42 and the image data 22b to display the downward arrow 43 are transmitted to the display controller 32.

Then based on the instruction by the processing at S9, the display controller 32 draws the depth 42 in the position of the object recognized as a fish school indicated with the fish depth data 23e below the fish mark 41, and the downward arrow 43 on the left hand of the depth 42, using the respective previously-transmitted image data 22b, with respect to the frame buffer of the VRAM 33. After the processing at S9, the fish detection processing ends.

Figure 5A:
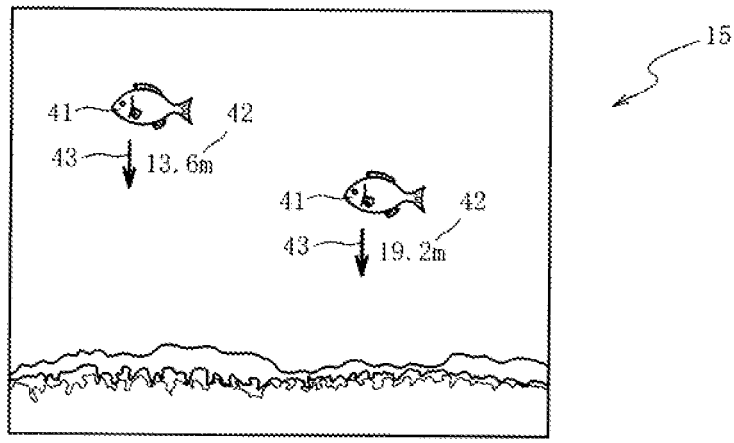
FIGS. 5A to 5C are examples of display content on a display device in the fishfinder according to a first embodiment when a fish mark display flag is ON and a distance display setting register is set to other value than "none"

Next, the detection image displayed on the display device 15 by the setting of the distance display setting register 23c to "depth" and the execution of the processing at S9 will be described with reference to FIG. 5A. FIG. 5A is an example of display content on the display device 15 when the distance display setting register 23c is set to "depth".

As shown in FIG. 5A, in the detection image, the fish mark 41 is displayed in the position of the object recognized as a fish school. In correspondence with the fish mark 41, the corresponding depth 42 in the position of the object recognized as a fish school is displayed blow the fish mark 41. Further, the downward arrow 43 is displayed on the left hand of the depth 42.

With this processing, when the distance display setting register 23c is set to "depth", the image shown in FIG. 5A is displayed in the display device 15. Even a user unaccustomed to display with the fishfinder 12 can instantly grasp the depth 42 in the position of the object recognized as a fish school. Further, it is possible, with the downward arrow 43 displayed on the left hand of the depth 42, to enable the user to instantly grasp that indicating the depth 42 is not the distance from the bottom but the depth from the surface.

Returning to FIG. 4, when it is determined as a result of determination at S8 that the distance display setting register 23c is set to "distance from bottom" (S8: "distance from bottom"), first, the distance 44 from the bottom in the position of the object recognized as a fish school is calculated (S10). The calculation of the distance 44 from the bottom is performed by subtracting the depth 42 indicated with the fish depth data 23e in the position of the object recognized as a fish school as a subject of calculation from the depth of the bottom indicated with the bottom depth data 23d.

Next, the display controller 32 is instructed to draw characters indicating the value of the distance 44 from the bottom in the position of the object recognized as a fish school, calculated by the processing at S10, below the fish mark 41 displayed in the position of the object recognized as a fish school, and the upward arrow 45 as a symbol indicating that it is the distance from the bottom on the left hand of the characters, with respect to the detection image drawn in the frame buffer of the VRAM 33 (S11). In the processing at S11, prior to the instruction, the image data 22*b* to display the characters indicating the value of the distance 44 from the bottom and the image data 22*b* to display the upward arrow 45 are transmitted to the display controller 32.

The display controller 32 draws the distance 44 from the bottom in the position of the object recognized as a fish school, indicated with the fish depth data 23*e*, below the fish mark 41, and the upward arrow 45 on the left hand of the distance 44 from the bottom, using the respective previously-transmitted image data 22*b*, with respect to the frame buffer of the VRAM 33, based on the instruction by the processing at S11. After the processing at S11, the fish detection processing ends.

Figure 5B:
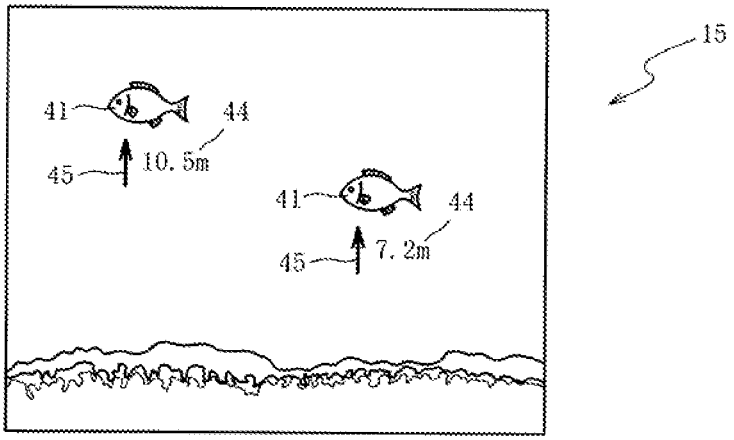

Next, the detection image, displayed on the display device 15 by the setting of the distance display setting register 23*c* to "distance from bottom" and execution of the processing at S10 and S11, will be described with reference to FIG. 5B. FIG. 5B is an example of display content on the display device 15 when the distance display setting register 23*c* is set to "distance from bottom".

As shown in FIG. 5B, in the detection image, in correspondence with the fish mark 41 displayed in the position of the object recognized as a fish school, the corresponding distance 44 from the bottom in the position of the object recognized as a fish school is displayed below the fish mark 41, and the upward arrow 45 is displayed on the left hand of the distance 44 from the bottom.

With this processing, when the distance display setting register 23*c* is set to "distance from bottom", the image shown in FIG. 5B is displayed on the display device 15. Even a user unaccustomed to display with the fishfinder 12 can instantly grasp the distance 44 from the bottom in the position of the object recognized as a fish school. Accordingly, when fishing of submerging a sinker or a rig to the bottom then retrieving the fishline is performed, it is possible to easily determine the amount of retrieval of the fishline. Further, it is possible with the upward arrow 45 displayed on the left hand of the distance 44 to enable the user to instantly grasp that indicating the distance 44 from the bottom is not the depth but the distance from the bottom.

Returning to FIG. 4, when it is determined as a result of determination at S8 that the distance display setting register 23*c* is set to "both" (S8: "both"), first, the distance 44 from the bottom in the position of the object recognized as a fish school is calculated as in the case of the processing at S10 (S12).

Next, the display controller 32 is instructed to draw characters indicating the value of the depth 42 in the position of the object recognized as a fish school above the fish mark 41 displayed in the position of the object recognized as a fish school, and the downward arrow 43 as a symbol indicating that it is a depth from the surface, on the left hand of the characters, with respect to the detection image drawn in the frame buffer of the VRAM 33 (S13). The depth 42 in the position of the object recognized as a fish school is specified with the fish depth data 23*e*. Further, in the processing at S13, prior to the instruction, the image data 22*b* to display the characters indicating the value of the depth 42 and the image data 22*b* to display the downward arrow 43 are transmitted to the display controller 32.

Then based on the instruction by the processing at S13, the display controller 32 draws the depth 42 in the position of the object recognized as a fish school, indicated with the fish depth data 23*e*, above the fish mark 41, and the downward arrow 43, on the left hand of the depth 42, using the respective previously-transmitted image data 22*b*, with respect to the frame buffer of the VRAM 33.

Next, the same processing as that at S11 is performed by the processing at S14. The display controller 32 draws the distance 44 from the bottom in the position of the object recognized as a fish school, indicated with respect to the corresponding fish school with the fish depth data 23*e*, below the fish mark 41, and the upward arrow 45, on the left hand of the distance 44 from the bottom, with respect to the frame buffer of the VRAM 33, based on the instruction by the processing at S14. After the processing at S14, the fish detection processing ends.

Figure 5C:
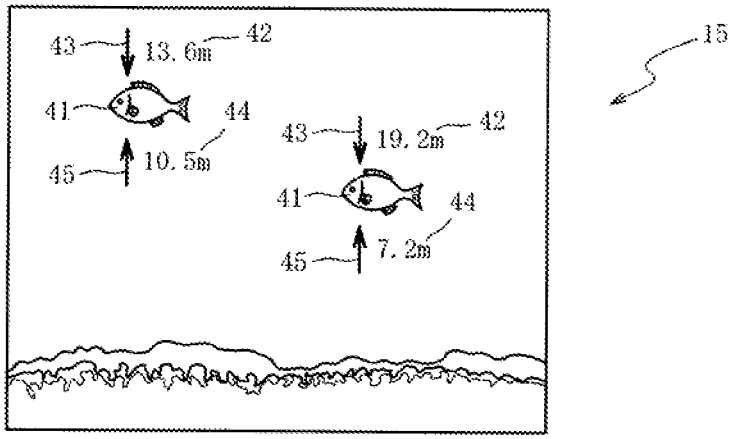

Next, the detection image, displayed on the display device 15 by the setting of the distance display setting register 23*c* to "both" and the execution of the processing at S12 to S14, will be described with reference to FIG. 5C. FIG. 5C is an example of display content on the display device 15 when the distance display setting register 23*c* is set to "both".

As shown in FIG. 5C, in the detection image, in correspondence with the fish mark 41 displayed in the position of the object recognized as a fish school, the corresponding depth 42 in the position of the object recognized as a fish school is displayed above the fish mark 41. Further, the downward arrow 43 is displayed on the left hand of the depth 42. In contrast, the corresponding distance 44 from the bottom in the position of the object recognized as a fish school is displayed below the fish mark 41. Further, the upward arrow 45 is displayed on the left hand of the distance 44 from the bottom.

With this processing, when the distance display setting register 23*c* is set to "both", the image shown in FIG. 5C is displayed on the display device 15. Even a user unaccustomed to display with the fishfinder 12 can instantly grasp the depth 42 in the position of the object recognized as a fish school and the distance 44 from the bottom. Especially, as the distance 44 from the bottom is directly indicated, when fishing of submerging a sinker or a rig to the bottom then retrieving the fishline is performed, it is possible to enable the user to easily determine the amount of retrieval of the fishline.

Further, it is possible, with the downward arrow 43 displayed on the left hand of the depth 42, to enable the user to instantly grasp that indicating the depth 42 is not the distance from the bottom but the depth from the surface. Further, it is possible, with the upward arrow 45 displayed on the left hand of the distance 44 from the bottom, to enable the user to instantly grasp that indicating the distance 44 from the bottom is not the depth but the distance from the bottom.

Further, the depth 42 is displayed above the fish mark 41, while the distance 44 from the bottom is displayed below the fish mark 41. It is possible to enable the user to instantly grasp whether the displayed value is the depth from the surface or the distance from the bottom in accordance with display position.

Returning to FIG. 4, when it is determined as a result of determination at S8 that the distance display setting register 23*c* is set to "none" (S8: "none"), the fish detection processing ends. With this processing, as the detection image, an image showing the fish mark 41 in the position of the object recognized as a fish school, but not showing the depth 42 and the distance 44 from the bottom in the position of the object recognized as a fish school, is displayed on the display device 15.

As described above, in the fishfinder 12 according to the first embodiment, when a reception signal, obtained by receiving a reflected wave of the ultrasonic wave beam TB transmitted underwater from the transducer 16, with the transducer 16, is input via the transmission/reception circuit 31, a detection image for 1 display line is generated based on the reception signal data 23a. Then detection images for plural display lines are arranged time sequentially with the display controller 32 and one detection image is formed.

Further, based on the reception signal data 23a, bottom recognition is performed and the depth of the bottom is calculated. Further, based on the reception signal data 23a, fish school recognition is performed, and when it is recognized that a fish school exists, the depth 42 in the position of the object recognized as a fish school is calculated. The distance 44 from the bottom in the position of the object recognized as a fish school is calculated from the depth of the bottom and the depth 42 in the position of the object recognized as a fish school. The calculated distance 44 from the bottom is displayed, in correspondence with the fish mark 41 displayed in the position of the object recognized as a fish school, on the display device 15.

It is possible with this processing to enable the user to instantly grasp the distance 44 from the bottom in the position of the object recognized as a fish school. Accordingly, when fishing of submerging a sinker or a rig to the bottom then retrieving the fishline is performed, it is possible to enable the user to easily determine the amount of retrieval of the fishline.

Further, as the upward arrow 45 is displayed on the left hand of the distance 44 from the bottom in the position of the object recognized as a fish school displayed on the display device 15, it is possible with the upward arrow 45 to enable the user to instantly grasp that indicating the distance 44 from the bottom is not the depth but the distance from the bottom.

In the case of a user accustomed to use of the fishfinder, this display may be rather troublesome. However, in the fishfinder 12 according to the first embodiment, when the user sets the fish mark display flag 23b to OFF and/or sets the distance display setting register 23c to "depth" or "none", the distance 44 from the bottom in the position of the object recognized as a fish school is hidden. With this arrangement, it is possible to display or hide the distance 44 from the bottom in the position of the object recognized as a fish school in accordance with user's necessity.

Further, in the fishfinder 12 according to the first embodiment, it is possible to display, not only the distance 44 from the bottom in the position of the object recognized as a fish school but also the depth 42 in the position of the object recognized as a fish school, in correspondence with the fish mark 41 displayed in the position of the object recognized as a fish school, on the display device 15. With this arrangement, it is possible to enable the user to instantly grasp the depth 42 in the position of the object recognized as a fish school in addition to the distance 44 from the bottom in the position of the object recognized as a fish school.

Further, when the depth 42 in the position of the object recognized as a fish school is displayed on the display device 15, as the downward arrow 43 is displayed on the left hand of the depth 42, it is possible with the downward arrow 43 to enable the user to instantly grasp that indicating the depth 42 is not the distance from the bottom but the depth.

Further, when the user sets the distance display setting register 23c on the condition that the fish mark display flag 23b is ON, it is possible to display only the depth 42 in the position of the object recognized as a fish school, display only the distance 44 from the bottom in the position, display both of the depth 42 and the distance 44 from the bottom, or hide both of them, in correspondence with the fish mark 41 displayed on the display device 15. Accordingly, it is possible to display only necessary information for the user on the display device 15 from the depth 42 and the distance 44 from the bottom in the position of the object recognized as a fish school.

Further, in the detection image, the fish mark 41 is displayed in the position of the object recognized as a fish school, and in correspondence with the fish mark 41, one or both of the depth 42 and the distance 44 from the bottom in the position of the object recognized as a fish school are displayed. With this arrangement, it is possible with the fish mark 41 to enable a user unaccustomed to use of the fishfinder 12 to easily grasp the position of the object recognized as a fish school in the detection image. In addition, it is possible to enable the user to instantly grasp the depth or the distance from the bottom in the position of the object recognized as a fish school.

Next, the fishfinder 12 according to a second embodiment will be described with reference to FIGS. 6A1 to 6A3. FIGS. 6A1 to 6A3 are examples of display content on the display device 15 in the fishfinder 12 according to the second embodiment when the fish mark display flag 23b is ON and the distance display setting register 23c is set to other value than "none". FIG. 6A1 shows an image displayed on the display device 15 when the distance display setting register 23c is set to "depth". FIG. 6A2 shows an image displayed on the display device 15 when the distance display setting register 23c is set to "distance from bottom". FIG. 6A3 shows an image displayed on the display device 15 when the distance display setting register 23c is set to "both".

Note that the configuration of the fishfinder 12 and the fish detection processing performed with the CPU 21 according to the second embodiment are the same as the configuration of the fishfinder 12 and the fish detection processing performed with the CPU 21 according to the first embodiment except the processing at S9 described below. In the following configuration, the constituent elements have the same reference numerals as those in the first embodiment, and explanations of the elements will be omitted.

In the fishfinder 12 according to the first embodiment, when the distance display setting register 23c is set to "depth" on the condition that the fish mark display flag 23b is ON, the depth 42 in the position of the object recognized as a fish school is displayed below the fish mark 41. In contrast, as shown in FIG. 6A1, in the fishfinder 12 according to the second embodiment, when the distance display setting register 23c is set to "depth" on the condition that the fish mark display flag 23b is ON, the depth 42 in the position of the object recognized as a fish school is displayed above the fish mark 41.

Further, in the fishfinder 12 according to the second embodiment, the downward arrow 43 indicating that indicating the depth 42 is not the distance from the bottom but the depth from the surface, is displayed on the left hand of the depth 42 displayed above the fish mark 41.

For this display, in the fish detection processing (see FIG. 4) performed with the CPU 21 in the fishfinder 12 according to the second embodiment, in the processing at S9 performed when it is determined by the processing at S8 that the distance display setting register 23c is set to "depth", the display controller 32 is instructed to draw characters indicating the value of the depth 42 in the position of the object recognized as a fish school, above the fish mark 41 displayed in the position of the object recognized as a fish school, and the downward arrow 43 as a symbol indicating that it is the depth from the surface, on the left hand of the characters, with respect to the detection image drawn in the frame buffer of the VRAM 33.

With this processing, the display controller 32 draws the depth 42 in the position of the object recognized as a fish school indicated with the fish depth data 23e above the fish mark 41, and the downward arrow 43, on the left hand of the depth 42, with respect to the frame buffer of the VRAM 33, based on the instruction by the processing at S9. Accordingly, when the distance display setting register 23c is set to "depth" on the condition that the fish mark display flag 23b is ON, the image shown in FIG. 6A1 is displayed on the display device 15.

Note that as shown in FIG. 6A2, in the image displayed on the display device 15 when the distance display setting register 23c is set to "distance from bottom" on the condition that the fish mark display flag 23b is ON, the corresponding distance 44 from the bottom in the position of the object recognized as a fish school is displayed below the fish mark 41, and the upward arrow 45 is display on the left hand of the distance 44 from the bottom, as in the case of the first embodiment.

Figure 3:
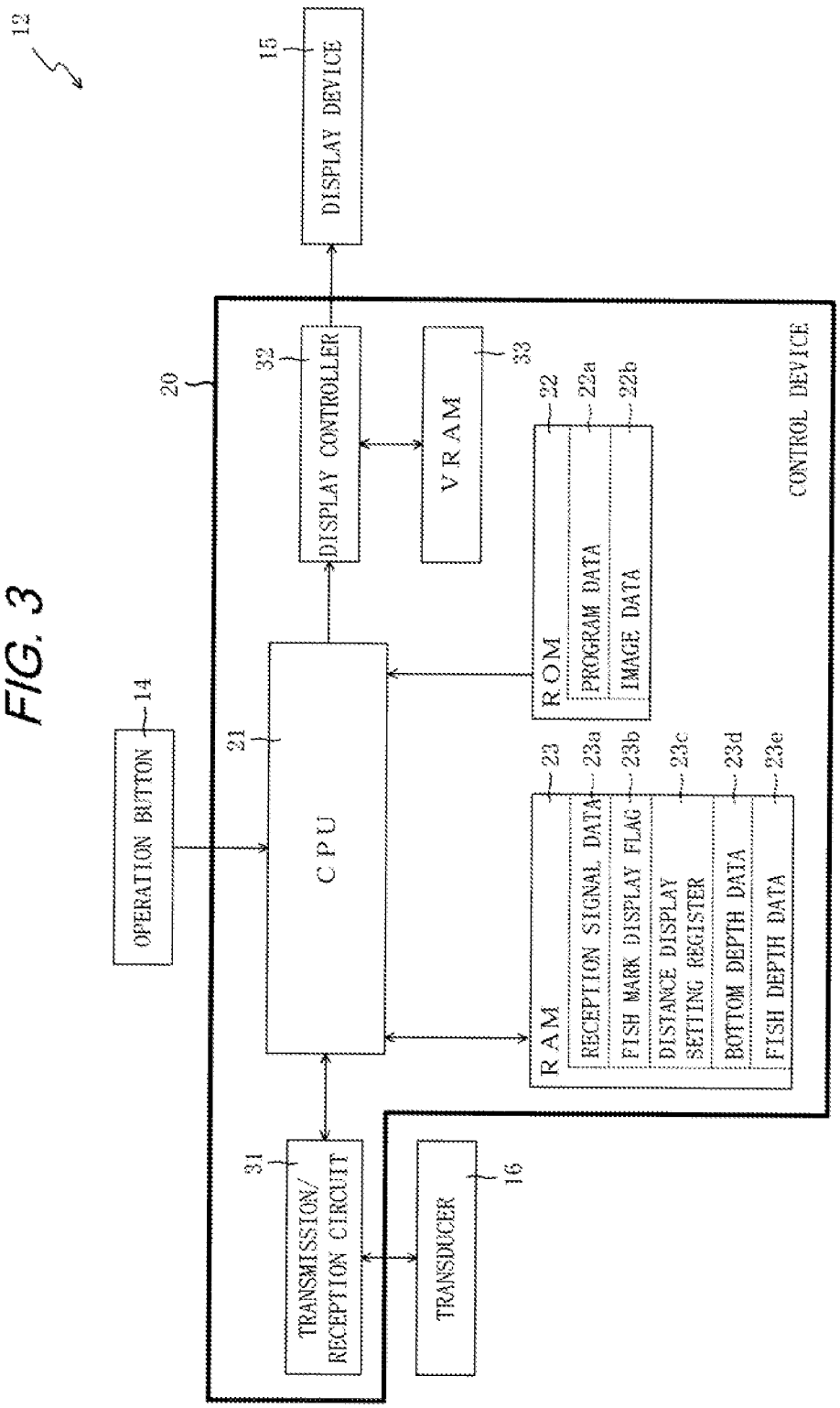
FIG. 3 is a block diagram showing an electrical configuration of the fishfinder.

Further, as shown in FIG. 6A3, in the image displayed on the display device 15 when the distance display setting register 23c is set to "both" on the condition that the fish mark display flag 23b is ON, the corresponding depth 42 in the position of the object recognized as a fish school is displayed above the fish mark 41, and the downward arrow 43 is displayed on the left hand of the depth 42, and further, the corresponding distance 44 from the bottom in the position of the object recognized as a fish school is displayed below the fish mark 41, and the upward arrow 45 is displayed on the left hand of the distance 44 from the bottom, as in the case of the first embodiment.

In the fishfinder 12 according to the second embodiment, the depth 42 in the position of the object recognized as a fish school is always displayed above the fish mark 41, and the distance 44 from the bottom in the position of the object recognized as a fish school is always displayed below the fish mark 41. Accordingly, it is possible to enable the user to instantly grasp that the numerical value displayed above the fish mark 41 is the depth 42 in the position of the object recognized as a fish school and the numerical value displayed below the fish mark 41 is the distance 44 from the bottom in the position of the object recognized as a fish school.

Further, the fishfinder 12 according to the second embodiment having the same configuration as that in the first embodiment has the same advantages.

Next, the fishfinder 12 according to a third embodiment will be described with reference to FIGS. 6B1 to 6B3. FIGS. 6B1 to 6B3 are examples of display content on the display device 15 in the fishfinder 12 according to the third embodiment when the fish mark display flag 23b is ON and the distance display setting register 23c is set to other value than "none". FIG. 6B1 shows an image displayed on the display device 15 when the distance display setting register 23c is set to "depth". FIG. 6B2 shows an image displayed on the display device 15 when the distance display setting register 23c is set to "distance from bottom". FIG. 6B3 shows an image displayed on the display device 15 when the distance display setting register 23c is set to "both".

Note that the configuration of the fishfinder 12 and the fish detection processing performed with the CPU 21 according to the third embodiment are the same as the configuration of the fishfinder 12 and the fish detection processing performed with the CPU 21 according to the first embodiment except the processing at S9, S11, S13 and S14 described below. In the following configuration, the constituent elements have the same reference numerals as those in the first embodiment, and explanations of the elements will be omitted.

In the fishfinder 12 according to the first embodiment, when the depth 42 in the position of the object recognized as a fish school is displayed in correspondence with the fish mark 41 displayed in the position of the object recognized as a fish school, the downward arrow 43 to enable the user to instantly grasp that indicating the depth 42 is the depth is displayed on the left hand of the depth 42. Further, in the fishfinder 12 according to the first embodiment, when the distance 44 from the bottom in the position of the object recognized as a fish school is displayed in correspondence with the fish mark 41 displayed in the position of the object recognized as a fish school, the upward arrow 45 to enable the user to instantly grasp that indicating the distance 44 is the distance from the bottom is displayed on the left hand of the depth 44 from the bottom.

In contrast, as shown in FIGS. 6B1 to 6B3, in the fishfinder 12 according to the third embodiment, when one or both of the depth 42 and the distance 44 from the bottom in the position of the object recognized as a fish school are displayed, symbols or pictures such as the downward arrow 43 and the upward arrow 45 to enable the user to instantly grasp that indicating the depth 42 or the distance 44 from the bottom is the depth 42 or the distance 44 from the bottom, are hidden.

In contrast, as shown in FIGS. 6B1 and 6B3, when the distance display setting register 23c is set to "depth" or "both" on the condition that the fish mark display flag 23b is ON, as shown in FIGS. 6B1 and 6B3, the depth 42 in the position of the object recognized as a fish school is displayed above the fish mark 41. Further, when the distance display setting register 23c is set to "distance from bottom" or "both" on the fish mark display flag 23b is ON, as shown in FIGS. 6B2 and 6B3, the distance 44 from the bottom in the position of the object recognized as a fish school is displayed below the fish mark 41.

For this display, in the fish detection processing (see FIG. 4) performed with the CPU 21 in the fishfinder 12 according to the third embodiment, in the processing at S9 performed when it is determined by the processing at S8 that the distance display setting register 23c is set to "depth", the display controller 32 is instructed to draw characters indicating the value of the depth 42 in the position of the object recognized as a fish school above the fish mark 41 displayed in the position of the object recognized as a fish school, with respect to the detection image drawn in the frame buffer of the VRAM 33.

With this processing, the display controller 32 draws the depth 42 in the position of the object recognized as a fish school, indicated with the fish depth data 23e, above the fish mark 41, with respect to the frame buffer of the VRAM 33, based on the instruction by the processing at S9. Accordingly, when the distance display setting register 23c is set to "depth" on the condition that the fish mark display flag 23b is ON, the image shown in FIG. 6B1 is displayed on the display device 15.

Further, in the processing at S11 performed when it is determined by the processing at S8 that the distance display setting register 23c is set to "distance from bottom", the display controller 32 is instructed to draw characters indicating the value of the distance 44 from the bottom in the position of the object recognized as a fish school below the fish mark 41 displayed in the position of the object recognized as a fish school, with respect to the detection image drawn in the frame buffer of the VRAM 33.

With this processing, the display controller 32 draws the distance 44 from the bottom in the position of the object recognized as a fish school, calculated by the processing at S10, below the fish mark 41, with respect to the frame buffer of the VRAM 33, based on the instruction by the processing at S11. Accordingly, when the distance display setting register 23c is set to "distance from bottom" on the condition that the fish mark display flag 23b is ON, the image shown in FIG. 6B2 is displayed on the display device 15.

Further, in the processing at S13 performed when it is determined by the processing at S8 that the distance display setting register 23c is set to "both", the same processing as that at S9 according to the third embodiment is performed. In the processing at S14, the same processing as that at S11 according to the third embodiment is performed. Accordingly, when the distance display setting register 23c is set to "both" on the condition that the fish mark display flag 23b is ON, the image shown in FIG. 6B3 is displayed on the display device 15.

In the fishfinder 12 according to the third embodiment, when one or both of the depth 42 and the distance 44 from the bottom in the position of the object recognized as a fish school are displayed on the display device 15 as in the case of the fishfinder 12 according to the first embodiment, the downward arrow 43 and the upward arrow 45 are not displayed in correspondence with the depth 42 or the distance 44 from the bottom.

In contrast, when the distance display setting register 23c is set to one of "depth" and "both" on the condition that the fish mark display flag 23b is ON, the depth 42 in the position of the object recognized as a fish school is displayed above the fish mark 41 in any case. Further, when the distance display setting register 23c is set to one of "distance from bottom" and "both" on the condition that the fish mark display flag 23b is ON, the distance 44 from the bottom in the position of the object recognized as a fish school is displayed below the fish mark 41 in any case.

Accordingly, even when symbols or pictures such as the downward arrow 43 or the upward arrow 45 indicating the depth or the distance from the bottom in the position of the object recognized as a fish school is not displayed, it is possible to enable the user to instantly grasp that the value displayed above the fish mark 41 is the depth 42 in the position of the object recognized as a fish school, and the value displayed below the fish mark 41 is the distance 44 from the bottom in the position of the object recognized as a fish school.

Further, the fishfinder 12 according to the third embodiment having the same configuration as that in the first or the second embodiment has the same advantages.

Next, the fishfinder 12 according to a fourth embodiment will be described with reference to FIGS. 7A1 to 7A3. FIGS. 7A1 to 7A3 are examples of display content on the display device 15 in the fishfinder 12 according to the fourth embodiment when the fish mark display flag 23b is ON and the distance display setting register 23c is set to other value than "none". FIG. 7A1 shows an image displayed on the display device 15 when the distance display setting register 23c is set to "depth". FIG. 7A2 shows an image displayed on the display device 15 when the distance display setting register 23c is set to "distance from bottom". FIG. 7A3 shows an image displayed on the display device 15 when the distance display setting register 23c is set to "both".

Note that the configuration of the fishfinder 12 and the fish detection processing performed with the CPU 21 according to the fourth embodiment are the same as the configuration of the fishfinder 12 and the fish detection processing performed with the CPU 21 according to the first embodiment except the processing at S9, S11, S13 and S14 described below. In the following configuration, the constituent elements have the same reference numerals as those in the first embodiment, and explanations of the elements will be omitted.

As shown in FIGS. 7A1 and FIG. 7A3, in the fishfinder 12 according to the fourth embodiment, when the depth 42 in the position of the object recognized as a fish school is displayed in correspondence with the fish mark 41 displayed in the position of the object recognized as a fish school, a downward triangle 46 is displayed in place of the downward arrow 43 in the first embodiment, on the left hand of the depth 42, as a symbol or picture to enable the user to instantly grasp that indicating the depth 42 is the depth.

Further, as shown in FIGS. 7A2 and 7A3, in the fishfinder 12 according to the fourth embodiment, when the distance 44 from the bottom in the position of the object recognized as a fish school is displayed in correspondence with the fish mark 41 displayed in the position of the object recognized as a fish school, an upward triangle 47 is displayed in place of the upward arrow 45 in the first embodiment, on the left hand of the distance 44 from the bottom, as a symbol to enable the user to instantly grasp that indicating the depth 44 is the distance from the bottom.

For this display, in the fish detection processing (see FIG. 4) performed with the CPU 21 in the fishfinder 12 according to the fourth embodiment, in the processing at S9 performed when it is determined by the processing at S8 that the distance display setting register 23c is set to "depth", the display controller 32 is instructed to draw characters indicating the value of the depth 42 in the position of the object recognized as a fish school, below the fish mark 41 displayed in the position of the object recognized as a fish school, and the downward triangle 46 as a symbol indicating that it is the depth from the surface, on the left hand of the characters, with respect to the detection image drawn in the frame buffer of the VRAM 33. Further, prior to the instruction, the image data 22b to display the characters indicating the value of the depth 42 and the image data 22b to display the downward triangle 46 are transmitted to the display controller 32.

With this processing, the display controller 32 draws the depth 42 in the position of the object recognized as a fish school, indicated with the fish depth data 23e, below the fish mark 41, and the downward triangle 46, on the left hand of the depth 42, using the respective previously-transmitted image data 22b, with respect to the frame buffer of the VRAM 33, based on the instruction by the processing at S9. Accordingly, when the distance display setting register 23c is set to "depth" on the condition that the fish mark display flag 23b is ON, the image shown in FIG. 7A1 is displayed on the display device 15.

Further, in the processing at S11 performed when it is determined by the processing at S8 that the distance display setting register 23c is set to "distance from bottom", the display controller 32 is instructed to draw characters indicating the value of the distance 44 from the bottom in the position of the object recognized as a fish school, below the fish mark 41 displayed in the position of the object recognized as a fish school, and the upward triangle 47 as a symbol indicating that it is the distance from the bottom, on the left hand of the characters, with respect to the detection image drawn in the frame buffer of the VRAM 33. Further, prior to the instruction, the image data 22b to display the characters indicating the value of the distance 44 from the bottom and the image data 22b to display the upward triangle 47 are transmitted to the display controller 32.

With this processing, the display controller 32 draws the distance 44 from the bottom in the position of the object recognized as a fish school, calculated by the processing at S10, below the fish mark 41, and the upward triangle 47, on the left hand of the distance 44 from the bottom, using the respective previously-transmitted image data 22*b*, with respect to the frame buffer of the VRAM 33, based on the instruction by the processing at S11. With this processing, when the distance display setting register 23*c* is set to "distance from bottom" on the condition that the fish mark display flag 23*b* is ON, the image shown in FIG. 7A2 is displayed on the display device 15.

Further, in the processing at S13 performed when it is determined by the processing at S8 that the distance display setting register 23*c* is set to "both", the display controller 32 is instructed to draw characters indicating the value of the depth 42 in the position of the object recognized as a fish school, above the fish mark 41 displayed in the position of the object recognized as a fish school, and the downward triangle 46 as a symbol indicating that it is the depth from the surface, on the left hand of the characters, with respect to the detection image drawn in the frame buffer of the VRAM 33. Further, prior to the instruction, the image data 22*b* to display the characters indicating the value of the depth 42, and the image data 22*b* to display the downward triangle 46, are transmitted to the display controller 32. Further, in the processing at S14, the same processing as that at S11 according to the fourth embodiment is performed.

With this processing, the display controller 32 draws the depth 42 in the position of the object recognized as a fish school, indicated with the fish depth data 23*e*, above the fish mark 41, and the downward triangle 46, on the left hand on the depth 42, using the respective previously-transmitted image data 22*b*, with respect to the frame buffer of the VRAM 33, based on the instruction by the processing at S13. Further, the display controller 32 draws the distance 44 from the bottom in the position of the object recognized as a fish school, calculated by the processing at S10, below the fish mark 41, and the upward triangle 47, on the left hand of the distance 44 from the bottom, using the respective previously-transmitted image data 22*b*, with respect to the frame buffer of the VRAM 33, based on the instruction by the processing at S14.

Accordingly, when the distance display setting register 23*c* is set to "both" on the condition that the fish mark display flag 23*b* is ON, the image shown in FIG. 7A3 is displayed on the display device 15.

In the fishfinder 12 according to the fourth embodiment, when the depth 42 in the position of the object recognized as a fish school is displayed on the display device 15, not the downward arrow 43, but the downward triangle 46 is displayed on the left hand of the depth 42. When the distance 44 from the bottom in the position of the object recognized as a fish school is displaced on the display device 15, not the upward arrow 45, but the upward triangle 47 is displayed on the left hand of the distance 44 from the bottom. In this manner, it is possible, without the downward arrow 43 and the upward arrow 45, but with the downward triangle 46, to enable the user to instantly grasp that indicating the depth 42 is not the distance from the bottom but the depth. Further, it is possible with the upward triangle 47 to enable the user to instantly grasp that indicating the distance 44 from the bottom is not the depth but the distance from the bottom.

Further, the fishfinder 12 according to the fourth embodiment having the same configuration as that in any one of the first to third embodiments has the same advantages.

Next, the fishfinder 12 according to a fifth embodiment will be described with reference to FIGS. 7B1 to 7B3. FIGS. 7B1 to 7B3 are examples of display content on the display device 15 in the fishfinder 12 according to the fifth embodiment when the fish mark display flag 23*b* is ON and the distance display setting register 23*c* is set to other value than "none". FIG. 7B1 shows an image displayed on the display device 15 when the distance display setting register 23*c* is set to "depth". FIG. 7B2 shows an image displayed on the display device 15 when the distance display setting register 23*c* is set to "distance from bottom". FIG. 7B3 shows an image displayed on the display device 15 when the distance display setting register 23*c* is set to "both".

Note that the configuration of the fishfinder 12 and the fish detection processing performed with the CPU 21 according to the fifth embodiment are the same as the configuration of the fishfinder 12 and the fish detection processing performed with the CPU 21 according to the first embodiment except the processing at S9, S11, S13 and S14 described below. In the following configuration, the constituent elements have the same reference numerals as those in the first embodiment, and explanations of the elements will be omitted.

As shown in FIGS. 7B1 and 7B3, in the fishfinder 12 according to the fifth embodiment, when the depth 42 in the position of the object recognized as a fish school is displayed in correspondence with the fish mark 41 displayed in the position of the object recognized as a fish school, an upward arrow 48 is displayed in place of the downward arrow 43 in the first embodiment as a symbol or picture to enable the user to instantly grasp that indicating the depth 42 is the depth, on the left hand of the depth 42. Note that an upward triangle may be displayed in place of the upward arrow 48.

Further, as shown in FIGS. 7B2 and 7B3, in the fishfinder 12 according to the fifth embodiment, when the distance 44 from the bottom in the position of the object recognized as a fish school is displayed in correspondence with the fish mark 41 displayed in the position of the object recognized as a fish school, a downward arrow 49 is displayed in place of the upward arrow 45 in the first embodiment, as a symbol to enable the user to instantly grasp that indicating the distance 44 from the bottom is the distance from the bottom, on the left hand of the distance 44 from the bottom. Note that a downward triangle may be displayed in place of the downward arrow 49.

That is, in the fifth embodiment, it is indicated, with the upward arrow 48 (or upward triangle) from the position of the object recognized as a fish school toward the surface, that indicating the depth 42 in the position of the object recognized as a fish school is the distance from the position of the object recognized as a fish school to the surface (i.e., the depth). Further, it is indicated, with the downward arrow 49 (or the downward triangle) from the position of the object recognized as a fish school to the bottom, that indicating the distance 44 from the bottom in the position of the object recognized as a fish school is the distance from the position of the object recognized as a fish school to the bottom.

For this display, in the fish detection processing (see FIG. 4) performed with the CPU 21 in the fishfinder 12 according to the fifth embodiment, in the processing at S9 performed when it is determined by the processing at S8 that the distance display setting register 23*c* is set to "depth", the display controller 32 is instructed to draw characters indicating the value of the depth 42 in the position of the object recognized as a fish school, below the fish mark 41 displayed in the position of the object recognized as a fish school, and the upward arrow 48 (or the upward triangle) as a symbol indicating that it is the depth from the surface, on the left hand of the characters, with respect to the detection image drawn in the frame buffer of the VRAM 33. Further, prior to the instruction, the image data 22b to display the characters indicating the value of the depth 42 and the image data 22b to display the upward arrow 48 (or the upward triangle) are transmitted to the display controller 32.

With this processing, the display controller 32 draws the depth 42 in the position of the object recognized as a fish school, indicated with the fish depth data 23e, below the fish mark 41, and the upward arrow 48 (or the upward triangle), on the left hand of the depth 42, using the respective previously-transmitted image data 22b, with respect to the frame buffer of the VRAM 33, based on the instruction by the processing at S9.

Accordingly, when the distance display setting register 23c is set to "depth" on the condition that the fish mark display flag 23b is ON, the image shown in FIG. 7B1 is displayed on the display device 15.

Further, in the processing at S11 performed when it is determined by the processing at S8 that the distance display setting register 23c is set to "distance from bottom", the display controller 32 is instructed to draw characters indicating the value of the distance 44 from the bottom in the position of the object recognized as a fish school, below the fish mark 41 displayed in the position of the object recognized as a fish school, and the downward arrow 49 (or the downward triangle) as a symbol indicating that it is the distance from the bottom, on the left hand of the characters, with respect to the detection image drawn in the frame buffer of the VRAM 33. Further, prior to the instruction, the image data 22b to display the characters indicating the value of the distance 44 from the bottom and the image data 22b to display the downward arrow 49 (or the downward triangle) are transmitted to the display controller 32.

With this processing, the display controller 32 draws the distance 44 from the bottom in the position of the object recognized as a fish school, calculated by the processing at S10, below the fish mark 41, and the downward arrow 49 (or the downward triangle), on the left hand of the distance 44 from the bottom, using the respective previously-transmitted image data 22b, with respect to the frame buffer of the VRAM 33, based on the instruction by the processing at S11.

Accordingly, when the distance display setting register 23c is set to "distance from bottom" on the condition that the fish mark display flag 23b is ON, the image shown in FIG. 7B2 is displayed on the display device 15.

Further, in the processing at S13 performed when it is determined by the processing at S8 that the distance display setting register 23c is set to "both", the display controller 32 is instructed to draw characters indicating the value of the depth 42 in the position of the object recognized as a fish school, above the fish mark 41 displayed in the position of the object recognized as a fish school, and the upward arrow 48 (or the upward triangle) as a symbol indicating that it is the depth from the surface, on the left hand of the characters, with respect to the detection image drawn in the frame buffer of the VRAM 33. Further, prior to the instruction, the image data 22b to display the characters indicating the value of the depth 42 and the image data 22b to display the upward arrow 48 (or the upward triangle) are transmitted to the display controller 32. Further, in the processing at S14, the same processing as that at S11 according to the fifth embodiment is performed.

With this processing, the display controller 32 draws the depth 42 in the position of the object recognized as a fish school, indicated with the fish depth data 23e, above the fish mark 41, and the upward arrow 48 (or the upward triangle), on the left hand of the depth 42, using the respective previously-transmitted image data 22b, with respect to the frame buffer of the VRAM 33, based on the instruction by the processing at S13. Further, the display controller 32 draws the distance 44 from the bottom in the position of the object recognized as a fish school, calculated by the processing at S10, below the fish mark 41, and the downward arrow 49 (or the downward triangle), on the left hand of the distance 44 from the bottom, using the respective previously-transmitted image data 22b, with respect to the frame buffer of the VRAM 33, based on the instruction by the processing at S14.

Accordingly, when the distance display setting register 23c is set to "both" on the condition that the fish mark display flag 23b is ON, the image shown in FIG. 7B3 is displayed on the display device 15.

Then the same processing as that at S9 according to the fifth embodiment is performed, then in the processing at S14, the same processing as that at S1 according to the fifth embodiment is performed. Accordingly, when the distance display setting register 23c is set to "both" on the condition that the fish mark display flag 23b is ON, the image shown in FIG. 7B3 is displayed on the display device 15.

In the fishfinder 12 according to the fifth embodiment, when the depth 42 in the position of the object recognized as a fish school is displayed on the display device 15, not the downward arrow 43, but the upward arrow 48 (or the upward triangle) is displayed on the left hand of the depth 42. Further, when the distance 44 from the bottom in the position of the object recognized as a fish school is displayed on the display device 15, not the upward arrow 45, but the downward arrow 49 (or the downward triangle), is displayed on the left hand of the distance 44 from the bottom.

In this manner, when the direction of the arrow (or the triangle) indicating the depth 42 in the position of the object recognized as a fish school and that of the arrow (or the triangle) indicating the distance 44 from the bottom in the position of the object recognized as a fish school are opposite in the vertical direction, it is possible with these arrows (or triangles) to enable the user to instantly grasp that indicating the depth 42 is not the distance from the bottom but the depth, and to enable the user to instantly grasp that indicating the distance 44 from the bottom is not the depth but the distance from the bottom.

Further, the fishfinder 12 according to the fifth embodiment, having the same configuration as that in any one of the first to fourth embodiments, has the same advantages.

Next, the fishfinder 12 according to a sixth embodiment will be described with reference to FIGS. 8A1 to 8A3. FIGS. 8A1 to 8A3 are examples of display content on the display device 15 in the fishfinder 12 according to the sixth embodiment when the fish mark display flag 23b is ON and the distance display setting register 23c is set to other value than "none". FIG. 8A1 shows an image displayed on the display device 15 when the distance display setting register 23c is set to "depth". FIG. 8A2 shows an image displayed on the display device 15 when the distance display setting register 23c is set to "distance from the bottom". FIG. 8A3 shows an image displayed on the display device 15 when the distance display setting register 23c is set to "both".

Note that the configuration of the fishfinder 12 and the fish detection processing performed with the CPU 21 according to the sixth embodiment are the same as the configuration of the fishfinder 12 and the fish detection processing performed with the CPU 21 according to the first embodiment except the processing at S9, S11, S13 and S14 described below. In the following configuration, the constituent elements have the same reference numerals as those in the first embodiment, and explanations of the elements will be omitted.

As shown in FIGS. 8A1 and 8A3, in the fishfinder 12 according to the sixth embodiment, when the depth 42 in the position of the object recognized as a fish school is displayed in correspondence with the fish mark 41 displayed in the position of the object recognized as a fish school, as a character 50, "U" is displayed in place of the downward arrow 43 in the first embodiment, as a symbol or picture to enable the user to instantly grasp that indicating the depth 42 is the depth, on the left hand of the depth 42.

Further, as shown in FIGS. 8A2 and 8A3, in the fishfinder 12 according to the sixth embodiment, when the distance 44 from the bottom in the position of the object recognized as a fish school is displayed in correspondence with the fish mark 41 displayed in the position of the object recognized as a fish school, as a character 51, "D" is displayed in place of the upward arrow 45 in the first embodiment, as a symbol to enable the user to instantly grasp that indicating the distance 44 from the bottom is the distance from the bottom, on the left hand of the distance 44 from the bottom.

That is, in the sixth embodiment, it is indicated with the "U" character 50 that indicating the depth 42 in the position of the object recognized as a fish school is the distance from the position of the object recognized as a fish school to the surface (i.e., depth). Further, it is indicated with the "D" character 51 that indicating the distance 44 from the bottom in the position of the object recognized as a fish school is the distance from the position of the object recognized as a fish school to the bottom (i.e. the distance from the bottom).

For this display, in the fish detection processing (see FIG. 4) performed with the CPU 21 in the fishfinder 12 according to the sixth embodiment, in the processing at S9 performed when it is determined by the processing at S8 that the distance display setting register 23c is set to "depth", the display controller 32 is instructed to draw characters indicating the value of the depth 42 in the position of the object recognized as a fish school, below the fish mark 41 displayed in the position of the object recognized as a fish school, and the "U" character 50 as a symbol indicating that it is the depth from the surface, on the left hand of the characters, with respect to the detection image drawn in the frame buffer of the VRAM 33. Further, prior to the instruction, the image data 22b to display the characters indicating the value of the depth 42 and the image data 22b to display the "U" character 50 are transmitted to the display controller 32.

With this processing, the display controller 32 draws the depth 42 in the position of the object recognized as a fish school, indicated with the fish depth data 23e, below the fish mark 41, and the "U" character 50, on the left hand of the depth 42, using the respective previously-transmitted image data 22b, with respect to the frame buffer of the VRAM 33, based on the instruction by the processing at S9. Accordingly, when the distance display setting register 23c is set to "depth" on the condition that the fish mark display flag 23b is ON, the image shown in FIG. 8A1 is displayed on the display device 15.

Further, in the processing at S11 performed when it is determined by the processing at S8 that the distance display setting register 23c is set to "distance from bottom", the display controller 32 is instructed to draw characters indicating the value of the distance 44 displayed in the position of the object recognized as a fish school, below the fish mark 41 displayed in the position of the object recognized as a fish school, and the "D" character 51 indicating that it is the distance from the bottom, on the left hand of the characters, with respect to the detection image drawn in the frame buffer of the VRAM 33. Further, prior to the instruction, the image data 22b to display the characters indicating the value of the distance 44 from the bottom and the image data 22b to display the "D" character 51 are transmitted to the display controller 32.

With this processing, the display controller 32 draws the distance 44 from the bottom in the position of the object recognized as a fish school, calculated by the processing at S10, below the fish mark 41, and the "D" character 51, on the left hand of the distance 44 from the bottom, using the respective previously-transmitted image data 22b, with respect to the frame buffer of the VRAM 33, based on the instruction by the processing at S11. Accordingly, when the distance display setting register 23c is set to "distance from bottom" on the condition that the fish mark display flag 23b is ON, the image shown in FIG. 8A2 is displayed on the display device 15.

Further, in the processing at S13 performed when it is determined by the processing at S8 that the distance display setting register 23c is set to "both", the display controller 32 is instructed to characters indicating the value of the depth 42 in the position of the object recognized as a fish school, above the fish mark 41 displayed in the position of the object recognized as a fish school, and the "U" character 50 as a symbol indicating that it is the depth from the surface, on the left hand of the characters, with respect to the detection image drawn in the frame buffer of the VRAM 33. Further, prior to the instruction, the image data 22b to display the characters indicating the value of the depth 42 and the image data 22b to display the "U" character 50 are transmitted to the display controller 32. Further, in the processing at S14, the same processing as that at S11 according to the sixth embodiment is performed.

With this processing, the display controller 32 draws the depth 42 in the position of the object recognized as a fish school, indicated with the fish depth data 23e, above the fish mark 41, and the "U" character 50, on the left hand of the depth 42, using the respective previously-transmitted image data 22b, with respect to the frame buffer of the VRAM 33, based on the instruction by the processing at S13. Further, the display controller 32 draws the distance 44 from the bottom in the position of the object recognized as a fish school, calculated by the processing at S10, below the fish mark 41, and the "D" character 51, on the left hand of the distance 44 from the bottom, using the respective previously-transmitted image data 22b, with respect to the frame buffer of the VRAM 33, based on the instruction by the processing at S14.

Accordingly, when the distance display setting register 23c is set to "both" on the condition that the fish mark display flag 23b is ON, the image shown in FIG. 8A3 is displayed on the display device 15.

In the fishfinder 12 according to the sixth embodiment, when the depth 42 in the position of the object recognized as a fish school is displayed on the display device 15 and the "U" character 50 in place of the downward arrow 43 is displayed on the left hand of the depth 42. When the distance 44 from the bottom in the position of the object recognized as a fish school is displayed on the display device 15, the "D" character 51 in place of the upward arrow 45 is displayed on the left hand of the distance 44 from the bottom. In this manner, it is possible, with symbols using characters, in addition to the symbols such as the arrow and triangles, to enable the user to instantly grasp that the numerical value displayed in correspondence with the fish mark 41 is the depth or the distance from the bottom in the position of the object recognized as a fish school.

Further, the fishfinder 12 according to the sixth embodiment having the same configuration as that in any one of the first to fifth embodiments has the same advantages.

Next, the fishfinder 12 according to a seventh embodiment will be described with reference to FIGS. 8B1 to 8B3. FIGS. 8B1 to 8B3 are examples of display content on the display device 15 in the fishfinder 12 according to the seventh embodiment when the fish mark display flag 23b is ON and the distance display setting register 23c is set to other value than "none". FIG. 8B1 shows an image displayed on the display device 15 when the distance display setting register 23c is set to "depth". FIG. 8B2 shows an image displayed on the display device 15 when the distance display setting register 23c is set to "distance from bottom". FIG. 8B3 shows an image displayed on the display device 15 when the distance display setting register 23c is set to "both".

Note that the configuration of the fishfinder 12 and the fish detection processing performed with the CPU 21 according to the seventh embodiment are the same as the configuration of the fishfinder 12 and the fish detection processing performed with the CPU 21 according to the first embodiment except the processing at S9, S11, S13 and S14 described below. In the following configuration, the constituent elements have the same reference numerals as those in the first embodiment, and explanations of the elements will be omitted.

In the first to sixth embodiments, the depth 42 or the distance 44 from the bottom is linked to the fish mark 41 by displaying the depth 42 or the distance 44 from the bottom in the position of the object recognized as a fish school in the vicinity of the fish mark 41 displayed in the position of the object recognized as a fish school.

In contrast, as shown in FIGS. 8B1 and 8B3, in the fishfinder 12 according to the seventh embodiment, when the depth 42 in the position of the object recognized as a fish school is displayed in correspondence with the fish mark 41 displayed in the position of the object recognized as a fish school, a bi-directional arrow 52 connecting the surface to the fish mark 41 is displayed, and the depth 42 in the position of the object recognized as a fish school is displayed in the vicinity of the arrow 52. Note that a line segment connecting the surface to the fish mark 41 may be displayed in place of the arrow 52.

Further, as shown in FIGS. 8B2 and 8B3, in the fishfinder 12 according to the seventh embodiment, when the distance 44 from the bottom in the position of the object recognized as a fish school is displayed in correspondence with the fish mark 41 displayed in the position of the object recognized as a fish school, a bidirectional arrow 53 connecting the bottom to the fish mark 41 is displayed, and the distance 44 from the bottom in the position of the object recognized as a fish school is displayed in the vicinity of the arrow 53. Note that a line segment connecting the bottom to the fish mark 41 may be displayed in place of the arrow 53.

That is, in the seventh embodiment, the arrow 52 indicates that the depth 42 displayed in the vicinity of the arrow 52 is the distance from the position of the object recognized as a fish school to the surface (i.e., the depth), further, it links the depth to the corresponding fish mark 41. Further, the arrow 53 indicates that the distance 44 from the bottom displayed in the vicinity of the arrow 53 is the distance from the position of the object recognized as a fish school to the bottom (i.e., the distance from the bottom), further, it links the distance to the [corresponding] fish mark 41.

For this display, in the fish detection processing (see FIG. 4) performed with the CPU 21 in the fishfinder 12 according to the seventh embodiment, in the processing at S9 performed when it is determined by the processing at S8 that the distance display setting register 23c is set to "depth", the display controller 32 is instructed to draw the arrow 52 connecting the surface to the fish mark 41, and characters indicating the value of the depth 42 in the position of the object recognized as a fish school in the vicinity of the arrow 52, with respect to the detection image drawn in the frame buffer of the VRAM 33. Further, prior to the instruction, the image data 22b to display the characters indicating the arrow 52 and the value of the depth 42 is transmitted to the display controller 32.

With this processing, the display controller 32 draws the arrow 52 connecting the surface to the fish mark 41, and the depth 42 in the position of the object recognized as a fish school, indicated with the fish depth data 23e, in the vicinity of the arrow 52, using the respective previously-transmitted image data 22b, with respect to the frame buffer of the VRAM 33, based on the instruction by the processing at S9. When the display controller 32 draws the arrow 52, the length of the arrow 52 is adjusted to a length to connect the surface to the fish mark 41 by extending or reducing the shaft (line segment) of the arrow drawn using the image data 22b.

Further, in the processing at S11 performed when it is determined by the processing at S8 that the distance display setting register 23c is set to "distance from bottom", the display controller 32 is instructed to draw the arrow 53 connecting the bottom to the fish mark 41, and characters indicating the value of the corresponding distance 44 from the bottom in the position of the object recognized as a fish school, in the vicinity of the arrow 53, with respect to the detection image drawn in the frame buffer of the VRAM 33. Further, prior to the instruction, the image data 22b to display the arrow 53 and the characters indicating the value of the distance 44 from the bottom is transmitted to the display controller 32.

With this processing, the display controller 32 draws the arrow 53 connecting the bottom to the fish mark 41, and the distance 44 from the bottom in the position of the object recognized as a fish school, calculated by the processing at S10, in the vicinity of the arrow 53, using the respective previously-transmitted image data 22b, with respect to the frame buffer of the VRAM 33, based on the instruction by the processing at S11. When the display controller 32 draws the arrow 53, the length of the arrow 53 is adjusted to a length to connect the bottom to the fish mark 41 by extending or reducing the shaft (line segment) of the arrow drawn using the image data 22b.

Further, in the processing at S13 performed when it is determined by the processing at S8 that the distance display setting register 23c is set to "both", the same processing as that at S9 according to the seventh embodiment is performed. Further, in the processing at S14, the same processing as that at S11 according to the seventh embodiment is performed. Accordingly, when the distance display setting register 23c is set to "both" on the condition that the fish mark display flag 23b is ON, the image shown in FIG. 8B3 is displayed on the display device 15.

In the fishfinder 12 according to the seventh embodiment, when the depth 42 in the position of the object recognized as a fish school is displayed on the display device 15, the bidirectional arrow 52 connecting the surface to the fish mark 41 is displayed on the display device 15, and the depth 42 is display in correspondence with the arrow 52. Further, when the distance 44 from the bottom in the position of the object recognized as a fish school is displayed on the display device 15, the bidirectional arrow 53 connecting the bottom to the fish mark 41 is displayed on the display device 15, and the distance 44 from the bottom is displayed in correspondence with the arrow 53.

In this manner, even when the depth 42 or the distance 44 from the bottom is not displayed in the vicinity of the fish mark 41, it is possible to link the fish mark 41 to the depth 42 or the distance 44 from the bottom in the position of the object recognized as a fish school, indicated with the fish mark 41, by displaying the arrow 52 or 53 and displaying the depth 42 or the bottom 44 in correspondence with the arrow 52 or 53. Accordingly, it is possible to enable the user to instantly grasp the depth 43 or the distance 44 from the bottom in the position of the object recognized as a fish school. Further, it is possible, with the arrow 52, to enable the user to instantly grasp that indicating the depth 42 is not the distance from the bottom but the depth. Further, it is possible, with the arrow 53, to enable the user to instantly grasp that indicating the distance 44 from the bottom is not the depth but the distance from the bottom.

Further, the fishfinder 12 according to the seventh embodiment having the same configuration as that in any one of the first to sixth embodiments has the same advantages.

Figure 9A:
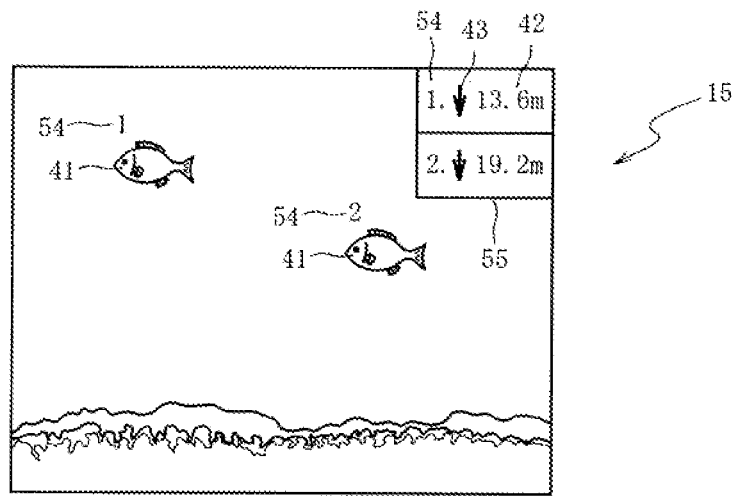
FIGS. 9A to 9C are examples of display content on the display device in the fishfinder according to an eighth embodiment of the present invention when the fish mark display flag is ON and the distance display setting register is set to other value than "none".
Figure 9B:
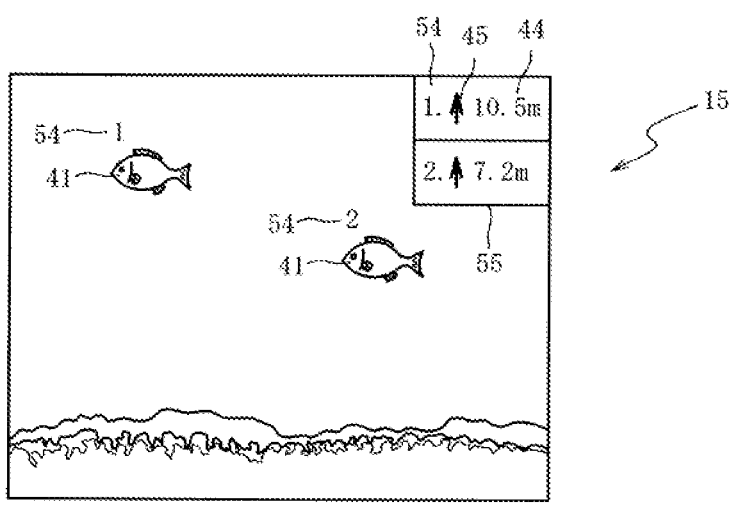
Figure 9C:
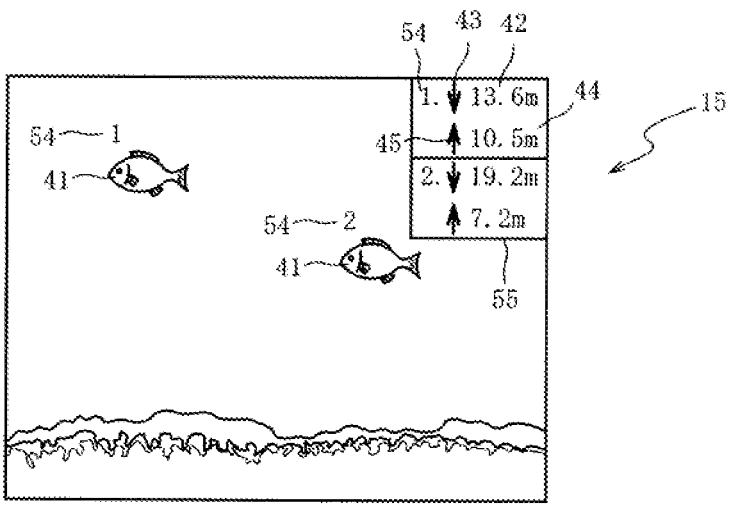

Next, the fishfinder 12 according to an eighth embodiment will be described with reference to FIGS. 9A to 9C. FIGS. 9A to 9C are examples of display content on the display device 15 in the fishfinder 12 according to the eighth embodiment when the fish mark display flag 23*b* is ON and the distance display setting register 23*c* is set to other value than "none". FIG. 9A shows an image displayed on the display device 15 when the distance display setting register 23*c* is set to "depth". FIG. 9B shows an image displayed on the display device 15 when the distance display setting register 23*c* is set to "distance from bottom". FIG. 9C shows an image displayed on the display device 15 when the distance display setting register 23*c* is set to "both".

Note that the configuration of the fishfinder 12 and the fish detection processing performed with the CPU 21 according to the eighth embodiment are the same as the configuration of the fishfinder 12 and the fish detection processing performed with the CPU 21 according to the first embodiment except the processing at S9, S11, S13 and S14 described below. In the following configuration, the constituent elements have the same reference numerals as those in the first embodiment, and explanations of the elements will be omitted.

In the first to sixth embodiments, the depth 42 or the distance 44 from the bottom is linked to the fish mark 41 by displaying the depth 42 or the distance 44 from the bottom in the position of the object recognized as a fish school in the vicinity of the fish mark 41 displayed in the position of the object recognized as a fish school.

In contrast, in the fishfinder 12 according to the eighth embodiment, an identification numbers "1", "2", . . . is allotted to the fish marks 41 displayed in the position of the object recognized as a fish school. Further, a region 55 to arrange the depth 42 or the distance 44 from the bottom in the position (the position of the object recognized as a fish school), where the fish mark 41 corresponding to each identification number is displayed, in the order of identification number, is provided in the image displayed on the display device 15. Then one or both of the depth 42 and the distance 44 from the bottom in the position of the object recognized as a fish school, where each fish mark 41 is displayed, are displayed in the region 55, in correspondence with value set in the distance display setting register 23*c* on the condition that the fish mark display flag 23*b* is ON. Further, the downward arrow 43 is displayed on the left hand (or on the right hand) of the depth 42, and the upward arrow 45 is displayed on the left hand (or on the right hand) of the distance 44 from the bottom.

For this display, in the fish detection processing (see FIG. 4) performed with the CPU 21 in the fishfinder 12 according to the eighth embodiment, in the processing at S9 performed when it is determined by the processing at S8 that the distance display setting register 23*c* is set to "depth", the display controller 32 is instructed to draw characters indicating the identification number 54 allotted to each fish mark 41 in the vicinity of (e.g. above) the fish mark 41 displayed in the position of the object recognized as a fish school, and draw each identification number 54, characters indicating the value of the depth 42 in the position of the object recognized as a fish school where the fish mark 41 corresponding to the identification number 54 is displayed, on the right hand of the identification number 54, and the downward arrow 43, on the left hand (or on the right hand) of the depth 42, in the region 55, with respect to the detection image drawn in the frame buffer of the VRAM 33. Further, prior to the instruction, the image data 22*b* to display these symbols to the display controller 32. With this processing, the display controller 32 draws the image shown in FIG. 9A with respect to the frame buffer of the VRAM 33 based on the instruction by the processing at S9, to display the image on the display device 15.

Further, in the processing at S11 performed when it is determined by the processing at S8 that the distance display setting register 23*c* is set to "distance from bottom", the display controller 32 is instructed to draw characters indicating the value of the identification number 54 allotted to each fish mark 41, in the vicinity of (e.g. above) the fish mark 41 displayed in the position of the object recognized as a fish school, and draw each identification number 54, characters indicating the value of the distance 44 from the bottom in the position of the object recognized as a fish school where the fish mark 41 corresponding to the identification number 54 is displayed, on the right hand of the identification number 54, and the upward arrow 45 on the left hand (or on the right hand) of the distance 44 from the bottom, in the region 55, with respect to the detection image drawn in the frame buffer of the VRAM 33. Further, prior to the instruction, the image data 22*b* to display these symbols is transmitted to the display controller 32. With this processing, the display controller 32 draws the image shown in FIG. 9B with respect to the frame buffer of the VRAM 33 based on the instruction by the processing at S11, and displays the image on the display device 15.

Further, in the processing at S13 performed when it is determined by the processing at S8 that the distance display setting register 23*c* is set to "both", the same processing as that at S9 according to the eighth embodiment is performed with respect to the detection image drawn in the frame buffer of the VRAM 33. Further, in the processing at S14, the display controller 32 is instructed to draw characters indicating the value of the distance 44 from the bottom in the position of the object recognized as a fish school where the fish mark 41 corresponding to each identification number 54 is displayed, on the right hand of the identification number and below the depth 42, and the upward arrow 45, on the left hand (or on the right hand) of the distance 44 from the bottom, with respect to the region 55. Further, prior to the instruction, the image data 22*b* to display these symbols is transmitted to the display controller 32.

With this processing, the display controller 32 draws the image shown in FIG. 9C with respect to the frame buffer of the VRAM 33 based on the instruction by the processing at S13 and S14, and displays the image on the display device 15.

In the fishfinder 12 according to the eighth embodiment, it is also possible, with the identification number allotted to each fish mark 41, to link the fish mark 41 to the depth 42 or the distance 44 from the bottom in the position of the object recognized as a fish school indicated with the fish mark 41. Accordingly, it is possible to enable the user to instantly grasp the depth 42 or the distance 44 from the bottom in the position of the object recognized as a fish school.

Further, the fishfinder 12 according to the eighth embodiment having the same configuration as that in any one of the first to seventh embodiments has the same advantages.

While the present invention has been described in conjunction with preferred embodiments, it should be understood that the present invention is not limited to those preferred embodiments. The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein. For example, a preferred embodiment may be modified, for instance, by adding one or more parts of the elements included in another embodiment to the preferred embodiment or by replacing one or more parts of the elements included in the preferred embodiment with one or more parts of the elements included in another embodiment. Further, numerical values used in the preferred embodiments are merely exemplary and may obviously be replaced by different numerical values.

In the respective embodiments, to indicate whether a numerical value displayed in correspondence with a position of an object recognized as a fish school is the depth 42 in the position or the distance 44 from the bottom, a symbol such as an arrow is displayed in correspondence with the numerical value, or the display positions of these numerical values are different in correspondence with the depth 42 and the distance 44 from the bottom. In addition to or in place of these symbols, the numerical values may be displayed in different colors. For example, it may be arranged such that the depth 42 is displayed in white, and the distance 44 from the bottom, in blue. With this arrangement, it is possible to enable the user to instantly grasp that indicating the depth 42 is not the distance from the bottom but the depth. Further, it is possible to enable the user to instantly grasp that indicating the distance 44 from the bottom is not the depth but the distance from the bottom.

Further, the color of the symbol such as an arrow may be changed in accordance with meaning of corresponding numerical value (the depth 42 or the distance 44 from the bottom). For example, it may be arranged such that when a numerical value corresponding to a symbol such as an arrow is the depth 42, the symbol is displayed in white. Further, it may be arranged such that when the numerical value corresponding to the symbol such as an arrow is the distance 44 from the bottom, the symbol is displayed in blue. With this arrangement, it is possible to enable the user to instantly grasp that indicating the depth 42 is not the distance from the bottom but the depth. Further, it is possible to enable the user to instantly grasp that indicating the distance 44 from the bottom is not the depth but the distance from the bottom.

In this case, it may be arranged such that only the color of the symbol such as an arrow is changed in accordance with meaning of corresponding numerical value, and the numerical value is displayed in the same color regardless of meaning of the numerical value. Further, it may be arranged such that only the color of the symbol such as an arrow is displayed in the same color, and the color of the numerical value is changed in accordance with meaning of corresponding numerical value. In the latter case, when a displayed numerical value is the depth 42, the symbol such as an arrow corresponding to the numerical value of the depth 42 may be displayed in white. When the displayed numerical value is the distance 44 from the bottom, the symbol such as an arrow corresponding to the numerical value of the distance 44 from the bottom may be displayed in blue.

In the respective embodiments except the third embodiment, symbols such as arrows are displayed on the left hand of the depth 42 and the distance 44 from the bottom in the position of the object recognized as a fish school, to indicate whether these numerical values are the depth 42 or the distance 44 from the bottom. The display position of the symbols is not limited to the left hand of depth 42 and the distance 44 from the bottom. The symbols may be displayed in the vicinity of the depth 42 and the distance 44 from the bottom. For example, the symbols may be displayed on the right hand of the depth 42 and the distance 44 from the bottom.

In the respective embodiments except the third embodiment, a symbol such as an arrow is displayed, to enable the user to instantly grasp whether the numerical value displayed in correspondence with the fish mark 41 is the depth 42 or the distance 44 from the bottom in the position of the object recognized as a fish school. Further, a picture may be displayed in place of the symbol such as the arrow. For example, it may be arranged such that a picture of a finger pointing downward is displayed in correspondence with the depth 42, and a picture of a finger pointing upward is displayed in correspondence with the distance 44 from the bottom. With this arrangement, it is possible to enable the user to instantly grasp that indicating the depth 42 is not the distance from the bottom but the depth. Further, it is possible to enable the user to instantly grasp that indicating the distance 44 from the bottom is not the depth but the distance from the bottom.

In the respective embodiments, a picture of a fish as the fish mark 41 is displayed in the position of an object recognized as a fish school in the detection image. The fish mark 41 is not limited to the picture of a fish, but another picture or a symbol such as a black dot "*" may be displayed in the position of the object recognized as a fish school. With this arrangement, it is possible to enable the user to instantly grasp that an object recognized as a fish school exists in the position where the picture or symbol is displayed.

In the respective embodiments, the depth 42 or the distance 44 from the bottom in the position of the object recognized as a fish school is displayed in correspondence with the fish mark 41 displayed in the position of the object recognized as a fish school. It may be arranged such that the fish mark 41 is not displayed, but the depth 42 or the distance 44 from the bottom are displayed in correspondence with the position of the object recognized as a fish school. In this case, the position to display the depth 42 or the distance 44 from the bottom in the position of the object recognized as a fish school may be in the vicinity of the (e.g. immediately above or below) the position of the object recognized as a fish school. Further, as a modification of the seventh embodiment, when the fish mark 41 is not displayed, it may be arranged such that the arrow 52 is displayed so as to connect the position of the object recognized as a fish school to the surface, and the arrow 53 is displayed so as to connect the position of the object recognized as a fish school to the bottom.

Further, it may be arranged such that, one or both of the depth 42 and the distance 44 from the bottom in the position of the object recognized as a fish school are displayed or hidden, in accordance with setting of the distance display setting register 23c, regardless of ON/OFF of the fish mark display flag 23b. Further, in a fishfinder which lacks a function to display the fish mark 41, the depth 42 and the distance 44 from the bottom in the position of the object recognized as a fish school may be displayed in correspondence with the position of the object recognized as a fish school.

In the respective embodiments, the present invention is applied to a fishfinder which performs underwater detection by transmitting the ultrasonic wave beam TB fixedly in one direction (immediately below the ship 11) underwater and receiving the reflected wave of the ultrasonic wave beam, however the present invention is not limited to this apparatus. For example, the present invention is applicable to a sonar type fishfinder which performs underwater detection in a predetermined range while changing the transmission direction of the ultrasonic wave beam TB transmitted in one direction.

Priority is claimed on Japanese Patent Application No. 2015-055961, filed Mar. 19, 2015, the content of which is incorporated herein by reference.

REFERENCE SIGNS LIST

12 . . . fishfinder
15 . . . display device (display part)
16 . . . transducer
41 . . . fish mark (third picture)
42 . . . depth in position of object recognized as a fish school (second depth)
43 . . . downward arrow (second symbol)
44 . . . distance from bottom in position of object recognized as a fish school
45 . . . upward arrow (first symbol)
46 . . . downward triangle (second symbol)
47 . . . upward triangle (first symbol)
48 . . . upward arrow (second symbol)
49 . . . downward arrow (first symbol)
50 . . . "U" character (second symbol)
51 . . . "D" character (first symbol)
52 . . . arrow (second symbol)
53 . . . arrow (first symbol)
S2 . . . (first depth calculation part)
S3 . . . (recognition part, second depth calculation part)
S7 . . . (fish-school position image display part)
S9, S13 . . . (depth display part)
S10, S12 . . . (distance calculation part)
S11, S14 . . . (distance display part)

What is claimed is:

1. A fishfinder comprising:
a transducer capable of transmitting an ultrasonic wave underwater, and receiving a reflected wave of the ultrasonic wave;
a display part that time-sequentially is configured to arrange a detection image, based on a reception signal caused by the transducer receiving the reflected wave of the ultrasonic wave transmitted from the transducer;
a first depth calculation part that is configured to calculate a first depth as a depth of a water bottom based on the reception signal reflected from the water bottom;
a recognition part that is configured to perform recognition on an object as a fish school based on the reception signal;
a second depth calculation part that is configured to calculate a second depth as a depth of a position from the transducer of the object recognized as the fish school with the recognition part;
a distance calculation part that is configured to calculate a distance from the water bottom to the position of the object recognized as the fish school with the recognition part, using a difference between the first depth calculated with the first depth calculation part and the second depth calculated with the second depth calculation part;
a distance display part that is configured to display, in the detection image displayed on the display part, the distance calculated with the distance calculation part; and
a depth display part that is configured to display, in the detection image displayed on the display part, the second depth calculated with the second depth calculation part,
wherein both the distance and the second depth are displayed in correspondence with the position of the object recognized as the fish school with the recognition part.

2. The fishfinder according to claim 1, wherein the distance display part is configured to display a first symbol or a first picture to indicate that the distance displayed on the display part is a distance from the water bottom, in correspondence with the distance, on the display part.

3. The fishfinder according to claim 2, wherein the depth display part is configured to display a second symbol or a second picture to indicate that the second depth displayed on the display part is a depth from a surface, in correspondence with the second depth, on the display part.

4. The fishfinder according to claim 3, further comprising a fish-school position image display part that is configured to display a third symbol or a third picture to indicate the fish school, in the position of the object recognized as the fish school with the recognition part, with respect to the detection image displayed on the display part,
wherein the distance display part is configured to display the distance calculated with the distance calculation part, in correspondence with the third symbol or the third picture displayed on the display part with the fish-school position image display part, on the display part.

5. The fishfinder according to claim 3,
wherein the distance display part is configured to display the first symbol or the first picture, in a third color, on the display part, and
wherein the depth display part is configured to display the second symbol or the second picture, in a fourth color different from the third color, on the display part.

6. The fishfinder according to claim 2, further comprising a fish-school position image display part that is configured to display a third symbol or a third picture to indicate the fish school, in the position of the object recognized as the fish school with the recognition part, with respect to the detection image displayed on the display part, wherein the distance display part is configured to display the distance calculated with the distance calculation part, in correspondence with the third symbol or the third picture displayed on the display part with the fish-school position image display part, on the display part.

7. The fishfinder according to claim 1, wherein the depth display part is configured to display a second symbol or a second picture to indicate that the second depth displayed on the display part is a depth from a surface, in correspondence with the second depth, on the display part.

8. The fishfinder according to claim 7, further comprising a fish-school position image display part that is configured to display a third symbol or a third picture to indicate the fish school, in the position of the object recognized as the fish school with the recognition part, with respect to the detection image displayed on the display part,
wherein the distance display part is configured to display the distance calculated with the distance calculation part, in correspondence with the third symbol or the third picture displayed on the display part with the fish-school position image display part, on the display part.

9. The fishfinder according to claim 1, further comprising a fish-school position image display part that is configured to display a third symbol or a third picture to indicate the fish school, in the position of the object recognized as the fish school with the recognition part, with respect to the detection image displayed on the display part,
wherein the distance display part is configured to display the distance calculated with the distance calculation part, in correspondence with the third symbol or the third picture displayed on the display part with the fish-school position image display part, on the display part.

10. The fishfinder according to claim 1,
wherein the distance display part is configured to display the distance, calculated with the distance calculation part, in first color, on the display part, and
wherein the depth display part is configured to display the second depth, calculated with the second depth calculation part, in a second color different from the first color, on the display part.

* * * * *